(12) United States Patent  
Asnis

(10) Patent No.: US 9,350,818 B2  
(45) Date of Patent: May 24, 2016

(54) METHOD AND SYSTEM FOR ENABLING DATA USAGE ACCOUNTING FOR UNRELIABLE TRANSPORT COMMUNICATION

(71) Applicant: OpenPeak Inc., Boca Raton, FL (US)

(72) Inventor: James Asnis, Santa Cruz, CA (US)

(73) Assignee: OPENPEAK INC., BOCA RATON, FL (US)

( * ) Notice: Subject to any disclaimer, the term of this patent is extended or adjusted under 35 U.S.C. 154(b) by 0 days.

(21) Appl. No.: 14/802,701

(22) Filed: Jul. 17, 2015

(65) Prior Publication Data

US 2016/0072904 A1 Mar. 10, 2016

Related U.S. Application Data

(63) Continuation-in-part of application No. 14/641,795, filed on Mar. 9, 2015, now Pat. No. 9,100,390, which is a continuation-in-part of application No. 14/615,799, filed on Feb. 6, 2015, which is a (Continued)

(51) Int. Cl.
| | |
|---|---|
| *G06F 15/16* | (2006.01) |
| *H04L 29/08* | (2006.01) |
| *G06Q 10/10* | (2012.01) |

(52) U.S. Cl.
CPC .............. *H04L 67/22* (2013.01); *G06Q 10/10* (2013.01); *H04L 67/306* (2013.01)

(58) Field of Classification Search
CPC ....... H04L 67/22; H04L 67/306; G06Q 10/10
See application file for complete search history.

(56) References Cited

U.S. PATENT DOCUMENTS

| | | | |
|---|---|---|---|
| 5,265,951 | A | 11/1993 | Kumar |
| 5,294,782 | A | 3/1994 | Kumar |

(Continued)

FOREIGN PATENT DOCUMENTS

| | | |
|---|---|---|
| KR | 100984639 B1 | 6/2006 |
| WO | 9705551 A1 | 2/1997 |

(Continued)

OTHER PUBLICATIONS

Final Office Action for U.S. Appl. No. 14/615,799, mailed Nov. 20, 2015, 18 pages.

(Continued)

*Primary Examiner* — Moustafa M Meky

(57) ABSTRACT

A method and system for data usage accounting are described herein. On a computing device that includes enterprise applications and personal applications, a datagram send request for an enterprise application can be received. The datagram send request may involve unreliable transport communication with a final destination and may be conducted in a native fashion with respect to the enterprise application. Based on the datagram send request, addressing information of a relay destination that is different from the final destination can be received. In addition, outbound datagrams of the unreliable transport communication can be corresponded with the received addressing information of the relay destination. The outbound datagrams of the unreliable transport communication may also be supplemented with the addressing information of the final destination. The outbound datagrams of the unreliable transport communication may also be transmitted to the relay destination to enable a data usage accounting of the datagram send request.

7 Claims, 14 Drawing Sheets

Related U.S. Application Data continuation-in-part of application No. 14/608,662, filed on Jan. 29, 2015, which is a continuation-in-part of application No. 14/573,601, filed on Dec. 17, 2014, which is a continuation of application No. 14/478,066, filed on Sep. 5, 2014, now Pat. No. 8,938,547.

(56) References Cited

U.S. PATENT DOCUMENTS

| | | |
|---|---|---|
| 5,357,585 A | 10/1994 | Kumar |
| 5,381,348 A | 1/1995 | Ernst et al. |
| 5,386,106 A | 1/1995 | Kumar |
| 5,484,989 A | 1/1996 | Kumar et al. |
| 5,489,001 A | 2/1996 | Yang |
| 5,489,773 A | 2/1996 | Kumar |
| 5,519,783 A | 5/1996 | Kumar |
| 5,521,369 A | 5/1996 | Kumar |
| 5,548,477 A | 8/1996 | Kumar et al. |
| 5,548,478 A | 8/1996 | Kumar |
| 5,616,906 A | 4/1997 | Kumar |
| 5,632,373 A | 5/1997 | Kumar et al. |
| 5,638,257 A | 6/1997 | Kumar et al. |
| 5,648,760 A | 7/1997 | Kumar |
| 5,696,496 A | 12/1997 | Kumar |
| 5,708,560 A | 1/1998 | Kumar et al. |
| 5,774,869 A | 6/1998 | Toader |
| 5,872,699 A | 2/1999 | Nishii et al. |
| 5,902,991 A | 5/1999 | Kumar |
| 5,925,873 A | 7/1999 | Kumar |
| 6,023,721 A | 2/2000 | Cummings |
| 6,027,021 A | 2/2000 | Kumar |
| 6,052,709 A | 4/2000 | Paul |
| 6,072,401 A | 6/2000 | Kumar |
| 6,084,769 A | 7/2000 | Moore et al. |
| 6,104,451 A | 8/2000 | Matsuoka et al. |
| 6,151,606 A | 11/2000 | Mendez |
| 6,181,553 B1 | 1/2001 | Cipolla et al. |
| 6,223,815 B1 | 5/2001 | Shibasaki |
| 6,266,539 B1 | 7/2001 | Pardo |
| 6,275,983 B1 | 8/2001 | Orton et al. |
| 6,276,448 B1 | 8/2001 | Maruno |
| 6,397,246 B1 | 5/2002 | Wolfe |
| 6,449,149 B1 | 9/2002 | Ohashi et al. |
| 6,457,030 B1 | 9/2002 | Adams et al. |
| 6,473,768 B1 | 10/2002 | Srivastava et al. |
| 6,571,221 B1 | 5/2003 | Stewart et al. |
| 6,647,103 B2 | 11/2003 | Pinard et al. |
| 6,674,640 B2 | 1/2004 | Pokharna et al. |
| 6,681,238 B1 | 1/2004 | Brice, Jr. et al. |
| 6,708,221 B1 | 3/2004 | Mendez et al. |
| 6,799,277 B2 | 9/2004 | Colvin |
| 6,952,617 B1 | 10/2005 | Kumar |
| 6,952,671 B1 | 10/2005 | Kolesnik et al. |
| 6,983,311 B1 | 1/2006 | Haitsuka et al. |
| 7,039,041 B2 | 5/2006 | Robohm et al. |
| 7,058,088 B2 | 6/2006 | Tomita et al. |
| 7,120,462 B2 | 10/2006 | Kumar |
| 7,130,193 B2 | 10/2006 | Hirafuji et al. |
| 7,149,543 B2 | 12/2006 | Kumar |
| 7,184,801 B2 | 2/2007 | Farcasiu |
| 7,236,770 B2 | 6/2007 | Sankaramanchi |
| 7,243,163 B1 | 7/2007 | Friend et al. |
| 7,275,073 B2 | 9/2007 | Ganji et al. |
| 7,301,767 B2 | 11/2007 | Takenoshita et al. |
| 7,392,531 B2 | 6/2008 | Thurston et al. |
| 7,447,799 B2 | 11/2008 | Kushner |
| 7,533,415 B2 * | 5/2009 | Chen ............... H04L 63/145 709/208 |
| 7,552,196 B2 | 6/2009 | Levi et al. |
| 7,574,177 B2 | 8/2009 | Tupman et al. |
| 7,574,200 B2 | 8/2009 | Hassan et al. |
| 7,577,462 B2 | 8/2009 | Kumar |
| 7,620,001 B2 | 11/2009 | Ganji |
| 7,620,392 B1 | 11/2009 | Maurya et al. |
| 7,627,343 B2 | 12/2009 | Fadell et al. |
| 7,688,952 B2 | 3/2010 | Light et al. |
| 7,702,322 B1 | 4/2010 | Maurya et al. |
| 7,778,035 B2 | 8/2010 | Huang et al. |
| 7,788,382 B1 | 8/2010 | Jones et al. |
| 7,821,984 B2 | 10/2010 | Wilson |
| 7,823,214 B2 | 10/2010 | Rubinstein et al. |
| 7,869,789 B2 | 1/2011 | Hassan et al. |
| 7,885,645 B2 | 2/2011 | Postma et al. |
| 7,890,091 B2 | 2/2011 | Puskoor et al. |
| 7,899,932 B2 * | 3/2011 | Takeda ............ H04L 29/12066 709/230 |
| 7,912,994 B2 | 3/2011 | Cornwell et al. |
| 7,958,245 B2 | 6/2011 | Thomas et al. |
| 7,970,386 B2 | 6/2011 | Bhat et al. |
| 7,992,084 B2 | 8/2011 | Ozawa |
| 8,000,736 B2 | 8/2011 | Forstall et al. |
| 8,010,701 B2 | 8/2011 | Wilkinson et al. |
| 8,012,219 B2 | 9/2011 | Mendez et al. |
| 8,051,432 B2 | 11/2011 | Dash et al. |
| 8,054,211 B2 | 11/2011 | Vidal |
| 8,060,074 B2 | 11/2011 | Danford et al. |
| 8,078,157 B2 | 12/2011 | Maurya et al. |
| 8,078,739 B1 | 12/2011 | Somasundaram et al. |
| 8,086,332 B2 | 12/2011 | Dorogusker et al. |
| 8,099,090 B2 | 1/2012 | Postma et al. |
| 8,099,541 B2 | 1/2012 | Serebrin |
| 8,180,893 B1 | 5/2012 | Spertus |
| 8,181,264 B2 | 5/2012 | Linn et al. |
| 8,185,149 B2 | 5/2012 | Forstall et al. |
| 8,199,507 B2 | 6/2012 | Shohet et al. |
| 8,254,902 B2 | 8/2012 | Bell et al. |
| 8,272,048 B2 | 9/2012 | Cooper et al. |
| 8,375,369 B2 | 2/2013 | Mensch et al. |
| 8,484,728 B2 | 7/2013 | De Atley et al. |
| 8,549,656 B2 | 10/2013 | Blaisdell et al. |
| 8,601,579 B2 | 12/2013 | Kristic et al. |
| 8,693,358 B2 | 4/2014 | Hodges |
| 8,695,060 B2 | 4/2014 | Wade et al. |
| 8,831,517 B2 | 9/2014 | Shankaranarayanan |
| 8,832,652 B2 | 9/2014 | Mueller et al. |
| 8,850,424 B2 | 9/2014 | Friedman et al. |
| 8,869,235 B2 | 10/2014 | Qureshi et al. |
| 8,893,261 B2 | 11/2014 | Fainkichen et al. |
| 8,893,298 B2 | 11/2014 | Roark et al. |
| 8,924,970 B2 | 12/2014 | Newell |
| 8,938,547 B1 | 1/2015 | Roberge et al. |
| 8,955,068 B1 | 2/2015 | Venkataramani et al. |
| 8,955,152 B1 | 2/2015 | Enderwick et al. |
| 8,959,579 B2 | 2/2015 | Barton et al. |
| 8,966,574 B2 | 2/2015 | Kiehtreiber et al. |
| 8,977,842 B1 | 3/2015 | McCorkendale et al. |
| 8,978,110 B2 | 3/2015 | Dabbiere et al. |
| 8,984,657 B2 | 3/2015 | Nerger et al. |
| 8,990,116 B2 | 3/2015 | Ferino et al. |
| 8,990,901 B2 | 3/2015 | Aravindakshan et al. |
| 8,990,920 B2 | 3/2015 | Pontillo et al. |
| 9,098,715 B1 | 8/2015 | Spear, Jr. et al. |
| 9,100,390 B1 | 8/2015 | Asnis et al. |
| 9,106,538 B1 | 8/2015 | Asnis et al. |
| 2001/0047363 A1 | 11/2001 | Peng |
| 2002/0013852 A1 | 1/2002 | Janik |
| 2002/0032609 A1 | 3/2002 | Wilkman |
| 2002/0103879 A1 | 8/2002 | Mondragon |
| 2002/0131404 A1 | 9/2002 | Mehta et al. |
| 2002/0133534 A1 | 9/2002 | Forslow |
| 2002/0172336 A1 | 11/2002 | Postma et al. |
| 2003/0002637 A1 | 1/2003 | Miyauchi et al. |
| 2003/0083988 A1 | 5/2003 | Reith |
| 2003/0090864 A1 | 5/2003 | Kuo |
| 2003/0130984 A1 | 7/2003 | Quinlan et al. |
| 2003/0177207 A1 | 9/2003 | Nagasaka et al. |
| 2003/0229718 A1 | 12/2003 | Took et al. |
| 2004/0019675 A1 | 1/2004 | Hebeler al al. |
| 2004/0030887 A1 | 2/2004 | Harrisville-Wolff et al. |
| 2004/0034853 A1 | 2/2004 | Gibbons et al. |
| 2004/0047348 A1 | 3/2004 | O'Neill et al. |
| 2004/0052343 A1 | 3/2004 | Glaser et al. |
| 2004/0060687 A1 | 4/2004 | Moss, II |
| 2004/0078812 A1 | 4/2004 | Calvert |

(56) References Cited

U.S. PATENT DOCUMENTS

| | | |
|---|---|---|
| 2004/0083125 A1 | 4/2004 | Almeida et al. |
| 2004/0098449 A1 | 5/2004 | Bar-Lavi et al. |
| 2004/0128665 A1 | 7/2004 | Gouleau et al. |
| 2004/0139170 A1 | 7/2004 | Shen et al. |
| 2004/0162092 A1 | 8/2004 | Marsico et al. |
| 2004/0190256 A1 | 9/2004 | Genova et al. |
| 2005/0107114 A1 | 5/2005 | Ocock |
| 2005/0120331 A1 | 6/2005 | Asare et al. |
| 2005/0131885 A1 | 6/2005 | Komatsu et al. |
| 2005/0144445 A1 | 6/2005 | Yeap et al. |
| 2005/0149726 A1 | 7/2005 | Joshi et al. |
| 2005/0177506 A1 | 8/2005 | Rissanen |
| 2005/0188318 A1 | 8/2005 | Tamir et al. |
| 2005/0213331 A1 | 9/2005 | Lewis |
| 2005/0238005 A1* | 10/2005 | Chen ................ H04L 63/145 370/389 |
| 2006/0030341 A1 | 2/2006 | Pham |
| 2006/0085645 A1 | 4/2006 | Bangui |
| 2006/0121880 A1 | 6/2006 | Cowsar et al. |
| 2006/0143250 A1 | 6/2006 | Peterson et al. |
| 2006/0184788 A1 | 8/2006 | Sandhu et al. |
| 2006/0200658 A1 | 9/2006 | Penkethman |
| 2006/0277209 A1 | 12/2006 | Kral et al. |
| 2006/0277311 A1 | 12/2006 | Franco et al. |
| 2007/0041536 A1 | 2/2007 | Koskinen et al. |
| 2007/0080823 A1 | 4/2007 | Fu et al. |
| 2007/0093243 A1 | 4/2007 | Kapadekar et al. |
| 2007/0150388 A1 | 6/2007 | Mendiratta et al. |
| 2007/0156870 A1 | 7/2007 | McCollum |
| 2007/0165654 A1 | 7/2007 | Chai et al. |
| 2007/0169105 A1 | 7/2007 | Amberny et al. |
| 2007/0183772 A1 | 8/2007 | Baldwin et al. |
| 2007/0209061 A1 | 9/2007 | Dekeyzer et al. |
| 2007/0239878 A1 | 10/2007 | Bowers et al. |
| 2007/0294380 A1 | 12/2007 | Natarajan et al. |
| 2008/0060085 A1 | 3/2008 | Samzelius et al. |
| 2008/0070495 A1 | 3/2008 | Stricklen et al. |
| 2008/0115225 A1 | 5/2008 | Jogand-Coulomb et al. |
| 2008/0125079 A1 | 5/2008 | O'Neil et al. |
| 2008/0126736 A1 | 5/2008 | Heil |
| 2008/0134325 A1 | 6/2008 | Kim et al. |
| 2008/0140969 A1 | 6/2008 | Lawrence |
| 2008/0201453 A1 | 8/2008 | Assenmacher |
| 2008/0222621 A1 | 9/2008 | Knight et al. |
| 2008/0271014 A1 | 10/2008 | Serebrin et al. |
| 2008/0281953 A1 | 11/2008 | Blaisdell |
| 2008/0287096 A1 | 11/2008 | Aaltonen et al. |
| 2008/0297481 A1 | 12/2008 | Higginson |
| 2008/0299989 A1 | 12/2008 | King et al. |
| 2009/0126017 A1 | 5/2009 | Chahal |
| 2009/0132828 A1 | 5/2009 | Kiester et al. |
| 2009/0150970 A1 | 6/2009 | Hinds et al. |
| 2009/0187726 A1 | 7/2009 | Serebrin et al. |
| 2009/0219899 A1 | 9/2009 | Dostal et al. |
| 2010/0004959 A1 | 1/2010 | Weingrad |
| 2010/0008337 A1 | 1/2010 | Bajko |
| 2010/0042478 A1 | 2/2010 | Reisman |
| 2010/0042990 A1 | 2/2010 | Kinder |
| 2010/0077035 A1 | 3/2010 | Li et al. |
| 2010/0115113 A1 | 5/2010 | Short et al. |
| 2010/0157543 A1 | 6/2010 | Shohet et al. |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2010/0180276 A1 | 7/2010 | Jiva |
| 2010/0192207 A1 | 7/2010 | Raleigh |
| 2010/0222097 A1 | 9/2010 | Gisby et al. |
| 2010/0235233 A1 | 9/2010 | Goldberg et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332635 A1 | 12/2010 | Rogel et al. |
| 2010/0333088 A1 | 12/2010 | Rogel et al. |
| 2011/0004941 A1 | 1/2011 | Mendez et al. |
| 2011/0029779 A1 | 2/2011 | Sekiya et al. |
| 2011/0038120 A1 | 2/2011 | Merz et al. |
| 2011/0040607 A1 | 2/2011 | Shkedi |
| 2011/0058052 A1 | 3/2011 | Bolton et al. |
| 2011/0082789 A1 | 4/2011 | Boyd |
| 2011/0082900 A1 | 4/2011 | Nagpal et al. |
| 2011/0093583 A1 | 4/2011 | Piemonte et al. |
| 2011/0145932 A1 | 6/2011 | Nerger et al. |
| 2011/0178863 A1 | 7/2011 | Daigle |
| 2011/0179483 A1 | 7/2011 | Paterson et al. |
| 2011/0208838 A1 | 8/2011 | Thomas et al. |
| 2011/0215949 A1 | 9/2011 | Yarnold et al. |
| 2011/0225252 A1 | 9/2011 | Bhat et al. |
| 2012/0005746 A1 | 1/2012 | Wei et al. |
| 2012/0066223 A1 | 3/2012 | Schentrup et al. |
| 2012/0070017 A1 | 3/2012 | Dorogusker et al. |
| 2012/0079423 A1 | 3/2012 | Bender et al. |
| 2012/0084184 A1 | 4/2012 | Raleigh et al. |
| 2012/0088481 A1 | 4/2012 | Postma et al. |
| 2012/0096364 A1 | 4/2012 | Wilkinson et al. |
| 2012/0096365 A1 | 4/2012 | Wilkinson et al. |
| 2012/0102564 A1 | 4/2012 | Schentrup et al. |
| 2012/0102574 A1 | 4/2012 | Schentrup et al. |
| 2012/0117274 A1 | 5/2012 | Lydon et al. |
| 2012/0144050 A1 | 6/2012 | Shah |
| 2012/0151464 A1 | 6/2012 | Koren et al. |
| 2012/0158829 A1 | 6/2012 | Ahmavaara et al. |
| 2012/0159567 A1 | 6/2012 | Toy et al. |
| 2012/0184282 A1 | 7/2012 | Malkamaki et al. |
| 2012/0185767 A1 | 7/2012 | Schlegel |
| 2012/0185879 A1 | 7/2012 | Van Vechten et al. |
| 2012/0210443 A1 | 8/2012 | Blaisdell et al. |
| 2012/0246484 A1 | 9/2012 | Blaisdell et al. |
| 2012/0246731 A1 | 9/2012 | Blaisdell et al. |
| 2012/0296744 A1 | 11/2012 | Cue et al. |
| 2012/0302204 A1 | 11/2012 | Gupta et al. |
| 2012/0304280 A1 | 11/2012 | Hayashida |
| 2012/0304310 A1 | 11/2012 | Blaisdell |
| 2012/0309348 A1 | 12/2012 | De Atley et al. |
| 2012/0311697 A1 | 12/2012 | Swingler et al. |
| 2012/0311702 A1 | 12/2012 | Krstic et al. |
| 2012/0324057 A1 | 12/2012 | Macris |
| 2013/0055341 A1 | 2/2013 | Cooper et al. |
| 2013/0091543 A1 | 4/2013 | Wade |
| 2013/0091557 A1 | 4/2013 | Gurrapu |
| 2013/0117805 A1 | 5/2013 | Kent et al. |
| 2013/0130652 A1 | 5/2013 | Deasy et al. |
| 2013/0132854 A1 | 5/2013 | Raleigh et al. |
| 2013/0132941 A1 | 5/2013 | Lindeman et al. |
| 2013/0145278 A1 | 6/2013 | Newell et al. |
| 2013/0145448 A1 | 6/2013 | Newell |
| 2013/0226669 A1 | 8/2013 | Chiang et al. |
| 2013/0247147 A1 | 9/2013 | Pontillo et al. |
| 2013/0254401 A1 | 9/2013 | Marshall et al. |
| 2013/0260713 A1 | 10/2013 | Toy et al. |
| 2013/0260730 A1 | 10/2013 | Toy et al. |
| 2013/0316703 A1 | 11/2013 | Girard et al. |
| 2014/0006237 A1 | 1/2014 | Chiang et al. |
| 2014/0007222 A1 | 1/2014 | Qureshi et al. |
| 2014/0047532 A1 | 2/2014 | Sowatskey |
| 2014/0059525 A1 | 2/2014 | Jawa et al. |
| 2014/0059573 A1 | 2/2014 | Jawa et al. |
| 2014/0059703 A1 | 2/2014 | Hung et al. |
| 2014/0082641 A1 | 3/2014 | Clark |
| 2014/0089376 A1 | 3/2014 | Caldas et al. |
| 2014/0089487 A1 | 3/2014 | Debate |
| 2014/0173747 A1 | 6/2014 | Govindaraju |
| 2014/0177839 A1 | 6/2014 | Wagner et al. |
| 2014/0181518 A1 | 6/2014 | Kim et al. |
| 2014/0181803 A1 | 6/2014 | Cooper et al. |
| 2014/0208397 A1 | 7/2014 | Peterson |
| 2014/0230008 A1 | 8/2014 | Feroz et al. |
| 2014/0230011 A1 | 8/2014 | Drewry et al. |
| 2014/0250505 A1 | 9/2014 | Kim et al. |
| 2014/0279454 A1 | 9/2014 | Raman et al. |
| 2014/0280934 A1 | 9/2014 | Reagan et al. |
| 2014/0280955 A1 | 9/2014 | Stuntebeck et al. |
| 2014/0281499 A1 | 9/2014 | Schentrup et al. |
| 2014/0282828 A1 | 9/2014 | Stuntebeck |
| 2014/0282829 A1 | 9/2014 | Dabbiere et al. |

(56) References Cited

U.S. PATENT DOCUMENTS

| | | | |
|---|---|---|---|
| 2014/0282846 | A1 | 9/2014 | DeWeese et al. |
| 2014/0282869 | A1 | 9/2014 | Dabbiere |
| 2014/0282894 | A1 | 9/2014 | Manton |
| 2014/0282897 | A1 | 9/2014 | Stuntebeck |
| 2014/0282929 | A1 | 9/2014 | Tse |
| 2014/0317679 | A1 | 10/2014 | Wade et al. |
| 2014/0337528 | A1 | 11/2014 | Barton et al. |
| 2015/0033324 | A1 | 1/2015 | Fainkichen et al. |
| 2015/0109967 | A1 | 4/2015 | Hogan et al. |
| 2015/0341362 | A1 | 11/2015 | Dobson et al. |

FOREIGN PATENT DOCUMENTS

| | | |
|---|---|---|
| WO | 2010080498 A1 | 7/2010 |
| WO | 2010080500 A1 | 7/2010 |
| WO | 2012024418 A1 | 2/2012 |
| WO | 2012037064 A1 | 3/2012 |
| WO | 2012061046 A2 | 5/2012 |
| WO | 2012061047 A1 | 5/2012 |
| WO | 2012064870 A2 | 5/2012 |
| WO | 2013050602 A1 | 4/2013 |

OTHER PUBLICATIONS

U.S. Appl. No. 14/811,158, filed Jul. 28, 30 pages.
M. Leech et al., SOCKS Protocol Version 5, Network Working Group, Mar. 1996, 7 pages.
Amendment and Reply and Declaration in Support of Amendment for U.S. Appl. No. 14/608,662, filed Sep. 4, 2015, 20 pages.
Amendment and Reply and Declaration in Support of Amendment for U.S. Appl. No. 14/615,799, filed Sep. 9, 2015, 20 pages.
Non-Final Office Action for U.S. Appl. No. 14/615,799, Feb. 6, 2015, mailed 9, 2015, 17 pages.
Non-Final Office Action for U.S. Appl. No. 14/658,998, Mar. 16, 2015, mailed 19, 2015, 21 pages.
Notice of Allowance and Examiners Amendment for U.S. Appl. No. 14/669,120, mailed Jun. 25, 2015, 31 pages.
International Search Report for Int'l Appln. No. PCT/US2011/038184, mailed on Aug. 26, 2011, 2 pages.
International Search Report and Written Opinion for Int'l Appln. No. PCT/US2011/060023, mailed on May 25, 2012, 10 pages.
International Search Report and Written Opinion for Int'Appln. No. PCT/US2011/048109, mailed on Dec. 12, 2011, 10 pages.
International Search Report and Written Opinion for Int'l Appln. No. PCT/US2012/045923, mailed on Oct. 4, 2012, 8 pages.
A Closer Look at Horizon App Manager Printout from Website: http://www.horizonmanager.com/?page_id=211 Copyright 2011 VMware, Inc.
Fulton, S.M., "Xerox Goes Up Against RIM in 'BYOD' Mobile Device Management," dated Feb. 22, 2012 [retrieved Aug. 2, 2012] retrieved from the Internet: <http://www.readwriteweb.com/cloud/2012/02/xerox-goes-up-against-rim-in-b.php>, 4 pgs.
International Search Report and Written Opinions for International Patent Application No. PCT/US2012/058689, mailed on Mar. 21, 2013, 13 pages.
Non-Final Office Action for U.S. Appl. No. 13/626,470, dated Jan. 6, 2014, 7 pages.
Amendment and Reply for U.S. Appl. No. 13/626,470, mailed Jan. 16, 2014, 21 pages.
International Search Report and Written Opinion for International Application No. PCT/US2009/068475, mailed on Apr. 23, 2010, 17 pages.
International Search Report and Written Opinion for International Application No. PCT/US2009/068482, mailed on Feb. 23, 2010, 12 pages.
International Search Report and Written Opinion for International Application No. PCT/US2011/051302, mailed on Jan. 26, 2012, 2 pages.
International Search Report and Written Opinion for International Application No. PCT/US2011/057351, mailed on May 9, 2012, 10 pages.
International Search Report and Written Opinion for International Application No. PCT/US2011/057354, mailed on May 9, 2012, 10 pages.
U.S. Appl. No. 14/608,662, filed Jan. 29, 2015, 42 pages.
U.S. Appl. No. 14/641,795, filed Mar. 9, 2015, 61 pages.
U.S. Appl. No. 14/615,799, filed Feb. 6, 2015, 50 pages.
U.S. Appl. No. 14/573,601, filed Dec. 17, 2014, 30 pages.
U.S. Appl. No. 14/658,998, filed Mar. 16, 2015, 41 pages.
Jack Madden, "Good Technology will soon let you bundle mobile data with their email app", Brian Madden, dated Jul. 31, 2014, 2 pages.
Jack Madden, "After mobile app management, the next step for BYOD can be split phone numbers and split billing", Brian Madden, dated Jan. 27, 2015, 2 pages.
U.S. Appl. No. 14/669,120, filed Mar. 26, 2015, 51 pages.
IBM, "Application Protection Inside an Untrusted OS," Feb. 9, 2010, 7 pages.
Non-Final Office Action for U.S. Appl. No. 14/205,686, mailed Dec. 5, 2014, 12 pages.
Non-Final Office Action for U.S. Appl. No. 14/205,661, mailed Dec. 22, 2014, 12 pages.
International Search Report and Written Opinion for International Application No. PCT /US2014/060657, mailed Jan. 29, 2015, 10 pages.
'Multifaceted Resource Management for Dealing with Heterogeneous Workloads in Virtualized Data Centers', 11th IEEE/ACM International Conference on Grid Computing, 2010 pp. 25-32. See abstract and sections I-II.
Extended European Search Report and Search Opinion for European Application No. 12839583.7, mailed Apr. 9, 2015, 6 pages.
International Search Report and Written Opinion for International Application No. PCT/US2014/060838, mailed Apr. 23, 2015, 15 pages.
Amendment and Reply for U.S. Appl. No. 14/205,686, filed May 1, 2015, 11 pages.
Amendment and Reply for U.S. Appl. No. 14/205,661, filed May 1, 2015, 10 pages.
Non-Final Office Action for U.S. Appl. No. 14/641,795, dated May 15, 2015, 16 pages.
Non-Final Office Action for U.S. Appl. No. 14/573,601, mailed Apr. 24, 2015, 18 pages.
U.S. Appl. No. 14/710,208, filed May 12, 2015, 80 pages.
Non-Final Office Action for U.S. Appl. No. 14/608,662, mailed Jun. 4, 2015, 19 pages.

* cited by examiner

METHOD AND SYSTEM FOR ENABLING DATA USAGE ACCOUNTING FOR UNRELIABLE TRANSPORT COMMUNICATION

CROSS-REFERENCE TO RELATED APPLICATIONS

This patent application is a continuation-in-part of U.S. patent application Ser. No. 14/641,795, filed on Mar. 9, 2015, which is a continuation-in-part of U.S. patent application Ser. No. 14/615,799, filed on Feb. 6, 2015, which is a continuation-in-part of U.S. patent application Ser. No. 14/608,662, filed on Jan. 29, 2015, which is a continuation-in-part of U.S. patent application Ser. No. 14/573,601, filed on Dec. 17, 2014, which is a continuation of U.S. patent application Ser. No. 14/478,066, filed on Sep. 5, 2014, now issued as U.S. Pat. No. 8,938,547 on Jan. 20, 2015, each of which is incorporated herein by reference in its entirety.

FIELD OF TECHNOLOGY

The present description relates to methods and systems for data usage accounting and more particularly, to methods and systems for data usage accounting for computing devices with enterprise applications and personal applications.

BACKGROUND

In an effort to increase productivity, many employers allow their workers to conduct business related to the employer on their personal mobile devices. In some cases, employers also provide some of their employees with company-issued mobile devices. In either arrangement, an employer understands that a single device may include sensitive data related to that employer in addition to data that is personal to the employee. Several advances have been made in an effort to protect an employer's data in these circumstances. For example, OpenPeak Inc. of Boca Raton, Fla. has developed solutions that enable a mobile device to include both enterprise and personal data but that isolate the enterprise data from the personal data. As part of these solutions, an employee may download secure applications that may be used to conduct transactions related to the enterprise.

Because the employee's device may include both personal and secure applications, it may be desirable to bifurcate the process of data usage accounting. In particular, the employer may wish to receive an accounting of the data usage associated with the secure applications that have been installed on the employee's device on behalf of the employer. This accounting, however, needs to be separate from data accounting that may be attributable to unsecure applications that the employee may have installed for personal use. Further complicating such a process is the use of unreliable transport communications, which do not rely on pre-arranged, fixed channels for transmitting data.

SUMMARY

A method for data usage accounting is described herein. As an example, the method can be practiced on a computing device that includes enterprise applications and personal applications. In the method, a datagram send request for an enterprise application can be received in which the datagram send request may involve unreliable transport communication with a final destination. The datagram send request may be conducted in a native fashion with respect to the enterprise application. As an example, the enterprise application may be a secure application in which an original target application has been wrapped, and the target application may perform the request natively, or in accordance with its original design.

Based on the datagram send request, addressing information of a relay destination that is different from the final destination can be received, and outbound datagrams of the unreliable transport communication may be corresponded with (such as attached with) the received addressing information of the relay destination. In addition, the outbound datagrams of the unreliable transport communication can be supplemented with the addressing information of the final destination. The outbound datagrams of the unreliable transport communication can be transmitted to the relay destination to enable a data usage accounting of the datagram send request. This data usage accounting can be used to determine the data usage of the enterprise application on an individual basis without making any changes to the original source code of the application. Moreover, the enterprise application, because it is relying on native calls, may be unaware of the redirect to the relay destination and may exchange data through the unreliable transport communication as it would through a conventional (no redirect) data exchange.

In one embodiment, inbound datagrams can be received from the relay destination, and addressing information of the final destination can be identified. The identified addressing information of the final destination may be selectively provided to the enterprise application. Also, a first socket for the unreliable transport communication may be established, and a second socket for a control channel with the relay destination can be established to enable the receipt of the addressing information of the unreliable transport relay destination. The control channel associated with the second socket can be established, and the outbound datagrams may be queued while the control channel is established.

As an example, supplementing the outbound datagrams of the unreliable transport communication with the addressing information of the final destination can include adding the addressing information of the final destination to a payload section of the outbound datagrams. As another example, identifying addressing information of the final destination can include identifying the addressing information of the final destination in a payload section of the inbound datagrams. In another embodiment, a call that is generated in response to the receipt of the datagram send request for the enterprise application can be intercepted. A request can also be made to the relay destination to facilitate the unreliable transport communication with the final destination, such as by allocating any necessary resources.

A method of enabling data usage accounting for unreliable transport communication is described herein. In this method, an enterprise application that is installed on the computing device can be launched in which the enterprise application has been identified for data usage accounting separate from personal applications installed on the computing device. A datagram send request that involves unreliable transport communication intended for a final destination can be received through the enterprise application. The datagram send request can be transparently redirected to facilitate the unreliable transport communication with a relay destination instead of the final destination. The transparency of the redirection can be with respect to the enterprise application. In addition, a request can be made to the relay destination to facilitate another unreliable transport communication with the final destination. The data can also be received from the final destination via the unreliable transport communication with the relay destination.

As an example, redirecting the datagram send request to facilitate the unreliable transport communication with a relay destination instead of the final destination can include the following: establishing a control channel with the relay destination in response to the receipt of the datagram send request through the enterprise application and receiving addressing information of the unreliable transport relay destination over the control channel. As another example, requesting the relay destination to facilitate another unreliable transport communication with the final destination can include requesting the relay destination to facilitate another unreliable transport communication with the final destination over the control channel.

In one arrangement, datagrams of the unreliable transport communication with the relay destination can be corresponded with the addressing information of the relay destination. As part of this process, addressing information of the final destination can be added to the datagrams of the unreliable transport communication to enable the relay destination to facilitate the other unreliable transport communication with the final destination. The datagrams may also be queued while the control channel with the relay destination is established. As another example, adding addressing information of the final destination to the datagrams of the unreliable transport communication can include adding addressing information of the final destination to a payload section of the datagrams of the unreliable transport communication.

In another embodiment, a connected socket to facilitate the unreliable transport communication with the relay destination instead of the final destination can be established. Alternatively, an unconnected socket to facilitate the unreliable transport communication with the relay destination instead of the final destination can be established. As an example, receiving data from the final destination via the unreliable transport communication with the relay destination can include the following: receiving datagrams that have had addressing information of the final destination added thereto and removing the addressing information of the final destination from the received datagrams for distribution to the enterprise application.

A computing device is also described herein. The computing device can include a display unit that is configured to display enterprise applications and personal applications and can also include a processor that is communicatively coupled to the display unit. The processor can be configured to receive an unreliable transport communication request from an enterprise application for a final destination and in response to the unreliable transport communication request from the enterprise application and in a transparent manner with respect to the enterprise application, the processor can be further configured to: cause a control channel to be established with a relay destination; cause an unreliable transport socket to be established to enable unreliable transport communication to occur with the relay destination; and cause a transmission of datagrams via the unreliable transport socket to the relay destination for distribution to the final destination.

As an example, the unreliable transport socket can be a connected unreliable transport socket or an unconnected unreliable transport socket. In addition, the processor can be configured to cause the transmission of the datagrams to the relay destination by at least causing the datagrams to be conventionally designated with addressing information of the relay destination and supplemented with addressing information of the final destination. The processor can be further configured to cause the datagrams to be supplemented with addressing information of the final destination by causing the addressing information of the final destination to be included with a payload section of the datagrams. In another arrangement, the processor can be further configured to selectively cause the datagrams to be temporarily stored while the control channel is established with the relay destination.

The computing device can also include an interface, such as a wide-area wireless communication stack, that is configured to receive addressing information of the relay destination from the relay destination over the control channel. The interface may be further configured to receive incoming datagrams from the relay destination that include addressing information of the final destination. In this case, the processor can be further configured to cause the addressing information of the final destination to be removed from the incoming datagrams and provided to the enterprise application. The processor can be further configured to cause a request for an unreliable transport communication resource to be transmitted over the control channel to the relay destination. As an example, the unreliable transport communication resource can be associated with an unreliable transport communication between the relay destination and the final destination.

Another computing device is described herein. The computing device can include a display unit that is configured to display enterprise applications and personal applications and can include a wireless communication stack that is configured to exchange communications with a relay destination. The computing device can also include a processor that is communicatively coupled to the display unit and the wireless communication stack. The processor can be configured to cause identification of enterprise applications for data exchange with the relay destination to enable data usage accounting of such data exchanges separate from data usage accounting of the personal applications and to cause a detection of a request by an enterprise application to conduct unreliable transport communication with a final destination. The processor can also be configured to cause a redirection of the request for the unreliable transport communication to the relay destination instead of the final destination in which the redirection is transparent to the enterprise application. As an example, this redirection can be conducted through the enterprise application, such as through a secure framework that encapsulates or wraps the enterprise application.

In one arrangement, the processor can be further configured to cause the redirection of the request for the unreliable transport communication to the relay destination instead of the final destination by causing a connected channel to be established between the computing device and the relay destination and by establishing an unreliable transport socket for exchanging data between the computing device and the relay destination. In another arrangement, the processor can be further configured to cause the redirection of the request for the unreliable transport communication to the relay destination instead of the final destination by causing datagrams to correspond to addressing information of the relay destination and by causing the datagrams to be supplemented with addressing information of the final destination.

In another arrangement, the processor can be further configured to cause the redirection of the request for the unreliable transport communication to the relay destination instead of the final destination by causing the datagrams to be transmitted to the relay destination once the datagrams are designated with the addressing information of the relay destination and supplemented with the addressing information of the final destination. In yet another arrangement, the processor can be further configured to cause the redirection of the request for the unreliable transport communication to the relay destination instead of the final destination by causing datagrams related to the unreliable transport communication to be queued while the connected channel is established between the computing device and the relay destination. As an example, the enterprise application can be a secure application that is part of a secure workspace of the computing device.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
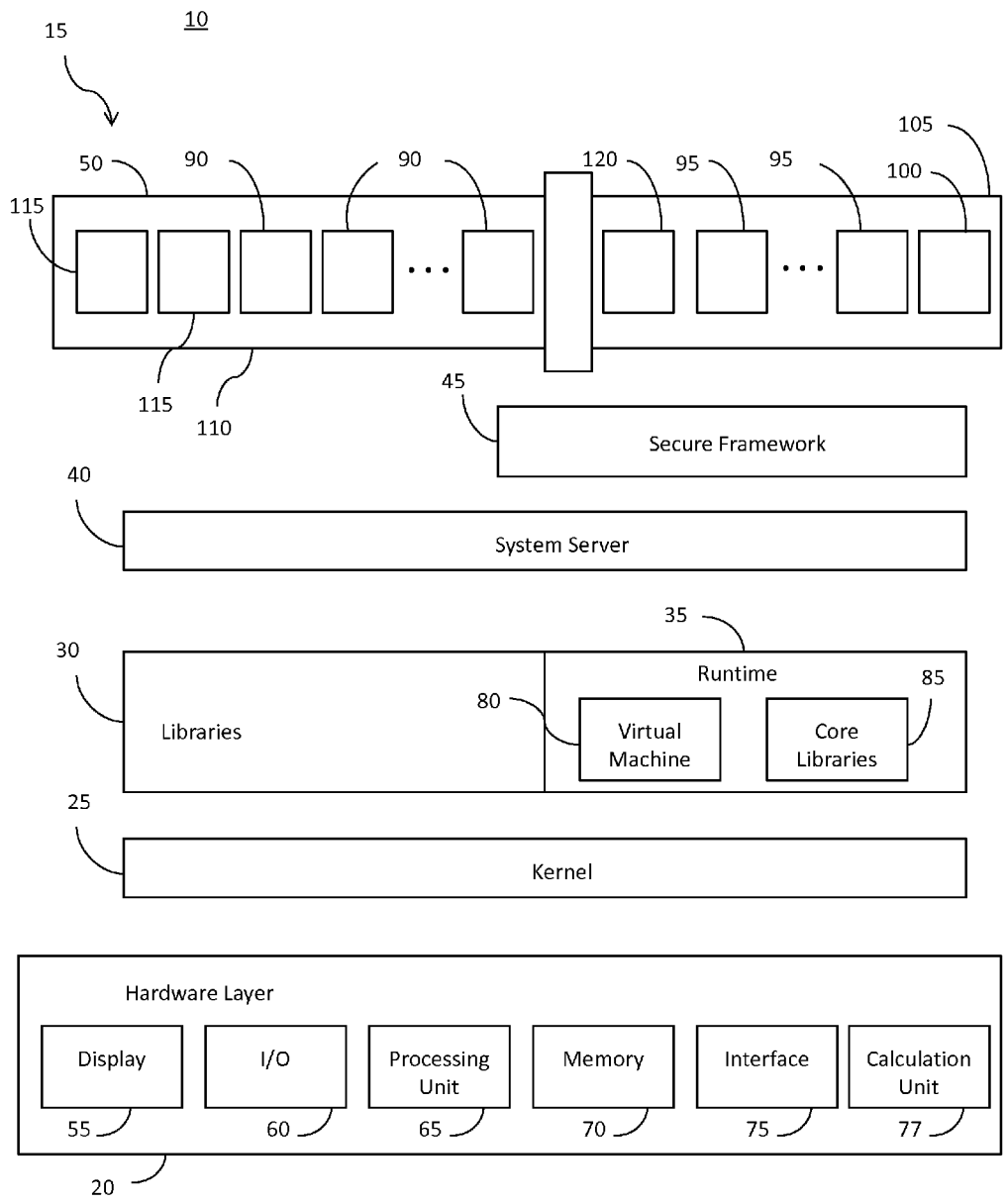
FIG. 1 illustrates an example of a block diagram of the system architecture of a computing device that is configured to practice the subject matter described herein.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The word "among," as it is used throughout this description, should not necessarily be interpreted as requiring exchanges or interaction among three or more applications, irrespective of grammar rules. The word "a" is not necessarily limited to a singular instance of something, as it may mean one or more.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "computer readable storage medium" is defined as one or more components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" or "processor" is defined as one or more hardware components that execute sets of instructions, and the components may be disparate parts or part of a whole unit and may not necessarily be located in the same physical location.

The terms "memory," "memory element" or "repository" are defined as one or more hardware components that are configured to store data, either on a temporary or persistent basis. The term "shared memory" is memory, a memory element or a repository that is accessible (directly or indirectly) by two or more applications or other processes. An "interface" is defined as a hardware component or a group of hardware components that enable(s) a device to communicate with one or more different devices, whether through hard-wired connections, wireless connections or a combination of both. An "input/output device" is defined as a device that is configured to at least receive input from a user or a machine that is intended to cause some action or other effect on a component with which the input device is associated. A "display" is defined as an apparatus that presents information in visual form and may or may not receive input through a touch screen.

The term "file system" is defined as an abstraction that is used to organize, store and retrieve data. The term "secure application" is defined as an application that has been modified or enhanced from its original form to restrict communications between the application and unauthorized programs, applications or devices and to restrict operation of the application based on policy or to alter, augment or add features associated with the operation of the application (or any combination thereof) or—in the case of the application not being modified—an application that is part of a secure workspace that is protected from data exchanges with applications that are part of a personal or an unsecure workspace. An "enterprise application" is defined as an application that is associated with an enterprise such that a user interacting with the application is performing an operation of behalf of the enterprise during at least some part of the time during the interaction, though not necessarily for each interaction. A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by that secure application or is an application that is not part of a secure workspace and is restricted from accessing data from the secure workspace. A "hub application" is defined as an application that receives input from one or more secure or enterprise applications and establishes connections with external entities on behalf of the secure or enterprise applications that provide such input. A "virtual machine" is defined as a platform-independent execution environment that emulates a physical machine.

The term "personal workspace" is defined as a workspace, profile or partition that is configured to contain the personal content and unsecure applications or other unsecure programs associated with a user of a computing device on which the personal workspace sits. The term "secure workspace" is defined as a workspace, profile or partition that is configured to contain secure content, secure applications and other secure programs and requires some form of authentication to be accessed.

The term "content provider" is defined as a site that offers data for consumption by a computing device. The term "system service" is defined as an application or a set of applications on a computing device that offer one or more features for access by an unsecure application, a secure application or an enterprise application. A "secure connection" is defined as a connection in which at least some portion of the data that is exchanged over the connection is encrypted or otherwise obfuscated from unauthorized parties, entities or processes. To "consume data" means to receive data from a source, transmit data to a recipient or both. An "external network entity" means an entity—such as a component or a service—that is part of a network that is external to or located remotely from a computing device. A "final endpoint" or "final destination" is a destination with which an application or process intends to establish a connection based on a data request. A "relay server" or "relay destination" is a server or other hardware component that facilitates a connection between a computing device and a remote or content server or some other final endpoint or final destination.

The term "initiate" is defined as to begin or start. The terms "authenticate," "authenticates," "authenticating," authenticated" or "authentication" are defined as a technique, process or series of steps in which an entity or device is verified or confirmed for access to some component, process, destination or data. An "authentication package" is defined as one or more items that are configured to be presented for the authentication of some component, process or data. An "authentication server" is defined as a server that is configured to accept an authentication package and—whether solely or in conjunction with another component—perform an authentication based at least on the authentication package. The phrase "uniquely associated with" is defined as an exclusive connection, relationship, link or affiliation between or among two or more objects, components or processes, such as a private key that is exclusively assigned to a single computing device. The word "facilitate" is defined as any act that supports, assists, simplifies, promotes or otherwise contributes to a process. The term "queue" is defined as a process of storing or otherwise delaying for an amount of time (unknown or known) prior to the execution of some action.

A "profile" is defined as a collection of data that is configured to provide a computing device with instructions for performing one or more tasks. To "establish a data session" means to cause, facilitate or oversee the set-up of a connection or link to the point that data exchange may occur between or among any number of components, objects or processes. The term "unreliable transport communication" is defined as a communication or method in which datagrams or some other discrete units of data of the communication are independently addressed and sent for routing to a destination. The delivery of the datagrams (to the destination) is not guaranteed nor is the order of their arrival. In unreliable transport communications, data exchange between components may occur without a prior arrangement, such as previous exchanges between such components, as there may be no connection of fixed duration between the components. The term "control channel" defined as a pre-arranged channel in which a connection between the end points of the channel is established prior to exchanging data between the end points. A "datagram" is defined as a self-contained, independent entity of data carrying sufficient information to be routed from a source to a destination without reliance on earlier exchanges between the source and the destination and/or the transporting network.

As explained earlier, solutions have been developed that enable a mobile device to include both personal and enterprise data. Accordingly, it may be useful to segregate data usage accounting associated with the enterprise side from usage associated with the personal space. This process can enable an enterprise to determine how much data that is consumed by the mobile device is the responsibility of the enterprise. In some cases, however, data may be exchanged through unreliable transport communication, which may complicate the ability to perform such accounting.

In view of this need, a method and system for data usage accounting, particularly for unreliable transport communication, are described herein. On a computing device that includes enterprise applications and personal applications, a datagram send request for an enterprise application can be received. The datagram send request may involve unreliable transport communication with a final destination and may be conducted in a native fashion with respect to the enterprise application. Based on the datagram send request, addressing information of a relay destination that is different from the final destination can be received. In addition, outbound datagrams of the unreliable transport communication can be corresponded with the received addressing information of the relay destination. The outbound datagram payloads of the unreliable communication may also be supplemented with the addressing information of the final destination. The outbound datagrams of the unreliable transport communication may also be transmitted to the relay destination to enable a data usage accounting of the datagram send request.

Through this arrangement, a computing device can redirect enterprise datagrams that are based on unreliable transport communication to permit the data to be monitored separately from personal data sessions. Further, this process may be transparent to the application being tracked, which can obviate the need for the application developer to change any source code of the original or target application.

Referring to FIG. 1, an example of a block diagram 10 of the system architecture of a computing device 15 is shown. In this arrangement, the computing device 15 can include a hardware layer 20, a kernel layer 25 and a libraries layer 30, which may include a plurality of native libraries. This architecture may also include a runtime environment 35, a system server 40, a secure framework 45 and an application layer 50.

In one arrangement, the hardware layer 20 may include any number and type of hardware components, such as one or more displays 55, one or more input/output (I/O) devices 60, one or more processing units (or processors) 65 and any suitable type and number of memory devices 70 and interfaces 75. Examples of the I/O devices 60 include speakers, microphones, physical keypads, etc. In addition, the display 55 can serve as an I/O device 60 in the form of a touch-screen display. The interface 75 can be configured to support various types of communications, including wired or wireless and through any suitable type of standards and protocols. As an example, the interface 75 can include one or more cellular communication stacks and one or more Wi-Fi communication stacks to enable the computing device 15 to conduct bidirectional communications with one or more cellular networks and one or more Wi-Fi networks, respectively. In one arrangement, the hardware layer 20 may also include a calculation unit 77, which can be configured to calculate or determine (or at least assist in the determination or calculation of) data usage totals associated with any type of session conducted on the computing device 15, including those originating from the application layer 50. The calculation unit 77 may be a separate component or may be part of the processing unit 65. In another arrangement, the calculation unit 77 may be remotely located such that it is external to the computing device 15. In such a case, information regarding the sessions may be sent to a remote location that supports the calculation unit 77, and the unit 77 can perform its calculation functions once it receives the information.

In addition, the runtime environment 35 can support any suitable number of virtual machines 80 and core libraries 85, although a virtual machine may not be needed in other arrangements, such as where native code is employed. The system server 40 can serve as an abstraction for the underlying layers for the applications in the application layer 50 and can provide numerous system services for the applications. As is known in the art, a system framework, which may be part of an application's process, can be employed to enable interaction with the system server 40 or other components. In this example, the application layer 50 may include any number of unsecure applications 90 and any number of secure applications 95, one of which may be a core secure application 100. One or more enterprise applications may also be part of the application layer 50, which or may not be secure applications 95. The secure framework 45 can function in a manner similar to that of a conventional framework, but the secure framework 45 can facilitate the encapsulation of a number of secure applications 95 to selectively restrict their data exchanges with the unsecure applications 90. In particular, the secure framework 45 can be configured to intercept and modify certain calls from the secure applications 95, prior to passing them to the system server 40. In one arrangement, these calls may be from the secure applications 95 or the system framework.

In many cases, the unsecure applications 90 are associated with the personal data of a user of the computing device 15. Some of these unsecure applications 90 may be personal applications of the user, such as applications that the user has purchased or licensed. In contrast, the secure applications 95 are typically associated with confidential or otherwise sensitive information that belongs to or is associated with an enterprise or some other organization, and the user of the device 15 may work for such an entity. In one arrangement, a virtual partition or workspace may be created on the computing device 15 in which the secure applications 95 (and the core secure application 100) are part of a secure workspace 105, and the unsecure applications 90 are part of a personal workspace 110. In certain cases, a user may be required to provide authentication information, such as a password, PIN or biometric data, to gain access to the secure workspace 105 or to any individual or group of secure applications 95.

In some cases, some of the unsecure applications 90 may be system services 115 that provide features or functionality that is associated with the type of operating system that is installed on the computing device 15. For example, the system service 115 may be an application or a set of applications that live in the background and support different tasks associated with the operating system of the device 15. System services 115 may facilitate the exposure of low-level functions of the hardware layer 20 and the kernel layer 25 to the higher-level application layer 50. Many system services 115 may operate with elevated privileges, in comparison to other applications. For example, a common system service 115 that is typically found on computing devices 15 is a media player, which processes and presents media data for a user. Another example of a system service 115 may be a photo viewer, which presents digital images for the user. As those skilled in the art will appreciate, the examples listed here are not meant to be limiting, and there are other system services 115 that may be available on the computing device 15.

In another embodiment, the system services 115 may be trusted unsecure applications 90 that secure applications 95 are permitted to share or otherwise exchange data with. An example of a trusted unsecure application 90 may be an unsecure application 90 that is by default installed on the computing device 15, such as by the manufacturer of the device 15 or a wireless carrier or other entity that provides services to the device 15. Another example of a trusted unsecure application 90 may be an unsecure application 90 that is listed on an application whitelist for one or more secure applications 95. By being part of the application whitelist, the trusted unsecure application 90 may be preapproved for data exchange with the relevant secure application(s) 95. Additional information on application whitelisting can be found in U.S. patent application Ser. No. 14/669,911, filed on Mar. 26, 2015, which is incorporated by reference herein in its entirety.

As noted above, the secure applications 95 and the system architecture may be configured to enable at least some of the calls to the system server 40 to be intercepted. There are several processes available for such a process. For example, U.S. Patent Application No. 62/033,142, which was filed on Aug. 5, 2014 and is herein incorporated by reference in its entirety, describes a method and system in which some of the system classes are overridden by classes associated with the core secure application 100, which can allow runtime hooks to be applied against certain system calls. Based on this technique, some of the calls that the secure applications 95 (or a system framework) make to the system services 115 can be intercepted and modified, a process that will described below. Another example of such a process is described in U.S. Patent Application No. 62/119,586, filed on Feb. 23, 2015, which is also herein incorporated by reference in its entirety.

As another example, U.S. Patent Application Publication No. 2015/0113506, which was filed on Mar. 12, 2014, and U.S. Patent Application Publication No. 2015/0113502, which was also filed on Mar. 12, 2014, each of which is herein incorporated by reference in its entirety, present methods and systems by which target applications are encapsulated as secure applications for distribution. Once installed and initiated on a computing device 15, the encapsulated application described in these references is loaded into memory, and runtime hooks are set to enable application programming interface (API) calls from the secure application to be intercepted. Similar to the description above, at least some of the calls to the system services 115 from the secure applications 95 (or a system framework) can be modified once they are intercepted. Other information on the process of intercepting certain functions of secure applications can be found in U.S. Pat. No. 8,695,060, issued on Apr. 8, 2014, which is also herein incorporated by reference in its entirety.

As described in these incorporated references, a secure application 95 can be configured to provide additional features that may not have been otherwise available prior to it being converted into a secure application 95. As an example, a secure application 95 can be arranged to track the amount of data that it uses for a particular session. This process enables an administrator to determine data usage on a per-application basis. Of course, secure applications 95 may be managed in accordance with many other policies or configurations, as is known in the art.

While many applications (or target applications) are able to be converted into secure applications 95, there are some applications that may not be so modified. For example, many system services 115 are default applications that are provided as part of the base configuration of the computing device 15. The developer of the operating system that provides these system services 115 may not permit the system services 115 to be converted into secure applications 95. As such, many system services 115 may remain as unsecure applications 90 on the computing device 15. Accordingly, the operation of a system service 115 may not be amenable to being controlled or managed, as is the case with secure applications 95. The relevance of this condition will be explained below.

In one embodiment, a hub application 120 may be part of the application layer 50. The hub application 120 may serve as a connection point for any number of secure applications 95 to enable the secure applications 95 to connect to any suitable external entity, including various network components. In particular, if a secure application 95 requires a connection with an external entity, the secure application 95 can request the hub application 120 to facilitate the communication. The hub application 120 can accept such requests from any of the secure applications 95, including from a single secure application 95 at a time or from multiple secure applications simultaneously. In accordance with the description herein, such a technique can facilitate the accounting of data usage associated with secure applications 95. In one example, the hub application 120 can be a daemon or some other process that runs in the background. Because the hub application 120 accepts requests from the secure applications 95, it may be considered as part of the secure workspace 105 and may not be permitted to accept requests from the unsecure applications 90. As an option, a similar arrangement can be made for the unsecure applications 90, or, alternatively, the hub application 120 can be configured to accept requests from both secure applications 95 and unsecure applications 90.

In one arrangement, the computing device 15 may contain personal applications and enterprise applications. In this example, the personal applications are designed for the personal interactions of a user, while the enterprise applications may be developed for the work or business interactions of a user. The enterprise applications in this setting may not necessarily be secure applications 95, as described herein, although some of them may be secure applications 95. In addition, a partition may be implemented in the computing device 15 to separate the personal applications from the enterprise applications. For example, a user may have separate log-ins for gaining access to the personal applications and to the enterprise applications. In this example, separate billing paths may be established for the personal applications and the enterprise applications, as is presented herein. In either case, however, data streams may be redirected to enable the segregated data tracking, as will be explained below.

Figure 2:
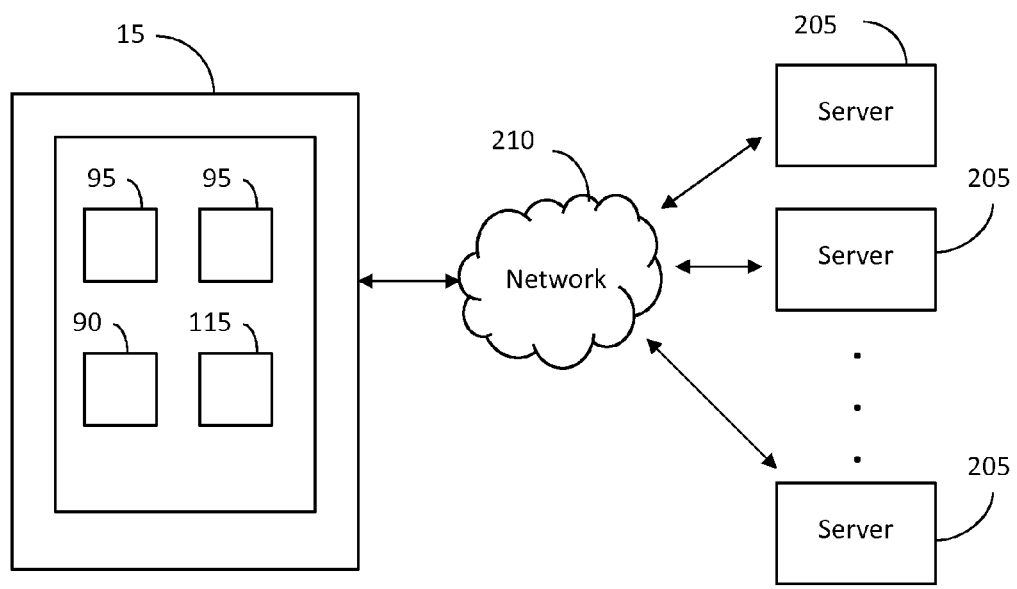
FIG. 2 illustrates an example of a system that shows the computing device of FIG. 1 in communication with one or more remote servers.

Referring to FIG. 2, a system 200 that shows the computing device 15 in communication with one or more remote servers 205 is shown. One or more communication networks 210 may facilitate the communications between the computing devices 15 and the remote servers 205. In this example, the computing device 15 may be a mobile computing device, although the principles described herein may apply to desktop computers or other fixed equipment. In addition, a mobile computing device may be, for example, a smartphone, laptop, tablet or other devices that may be carried by an individual. The network(s) 210 may be composed of various types of components to support wireless or wired communications (including both). The network(s) 210 may also be configured to support local or wide area communications (or both). The remote servers 205 may host any number of web sites that offer content that may be retrieved by the computing device 15 and may also be configured to accept data from the computing device 15. Because the servers 205 offer content, they may also be referred to as content providers, although the term "content provider" is certainly not limited to this particular example.

When operating the computing device 15, a user may wish to access data from any one of the remote servers 205. In some cases, the data access request may originate from an unsecure application 90. In the standard flow, the unsecure application 90 may sometimes forward the request to a relevant system service 115. For example, if a user wishes to view a video associated with one of the remote servers 205 through an unsecure application 90, the unsecure application 90 passes the request to a media player of the computing device 15. The media player then retrieves the data from the appropriate server 205 and presents such data to the user.

In the case of a secure application 95, a similar request would normally be passed to the media player, as well. In addition, the media player would conventionally establish a connection with the relevant remote server 205 and would present the requested data to the user. But because the system services 115 are typically not permitted to be converted into secure applications 95, implementing the feature of data accounting in them, as can be done with secure applications 95, may not be possible. In this instance, difficulties are presented in determining the percentage of data usage that is associated with secure applications 95 in comparison to the consumption of data by unsecure applications 90.

A solution is described here, however, that enables such an accounting to take place. In particular, the initial data request from the secure application 95 can be intercepted and modified prior to being passed to the media player. In view of the modification, the media player (or other system service 115) can direct the request back to the secure application 95, and a connection can be established between the secure application 95 and the appropriate remote server 205 to facilitate the exchange of data between the secure application 95 and the remote server 205. This redirection of the request through the secure application 95 can enable an accounting of the amount of data that is associated with this particular session, a feature that can be incorporated into secure applications 95. Accordingly, an accurate accounting of data usage associated with at least some or all secure applications 95 on the computing device 15 is now possible.

As previously mentioned, the counting of the data associated with a secure application 95 is not limited to being performed by the secure application 95 or even the computing device 15, as the calculation can be performed remotely. Moreover, the request is not limited to being redirected back to the secure application 95, as it may be redirected to another application or process on the device 15 or some other location, including one remote to the device 15. One example is for the request to be redirected to the hub application 120 of the device 15.

This arrangement can enable an entity to determine the percentage of data usage that is attributable to it and to the user on a personal basis. Because data usage may be segregated between enterprise use and personal use, the enterprise may be able to craft more accurate data plans with wireless carriers or other similar entities. Moreover, the user, who may own the computing device 15, would understand that the user would not be charged for data usage associated with that user's work or business and that the user would only be paying for personal data consumption.

Figure 3:
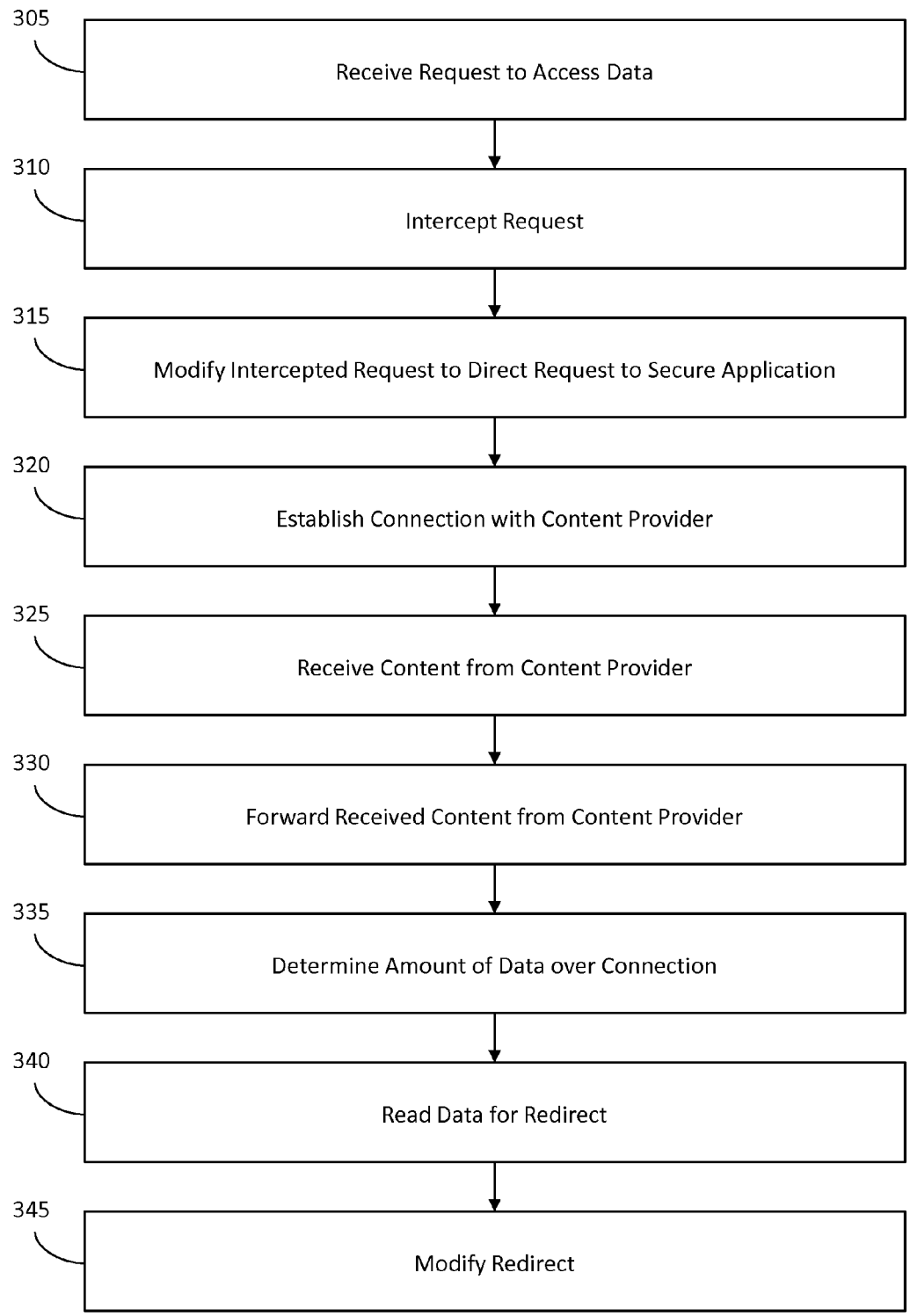
FIG. 3 illustrates an example of a method for data usage accounting.

Referring to FIG. 3, a method 300 of data usage accounting is shown. The method 300, however, may include additional or even fewer steps or processes in comparison to what is illustrated in FIG. 3. Moreover, the method 300 is not necessarily limited to the chronological order that is shown in FIG. 3. In describing the method 300, reference may be made to FIGS. 1, 2 and 4, although it is understood that the method 300 may be practiced with any other suitable systems and components and may take advantage of other suitable processes.

At step 305, in a setting that includes both secure applications and unsecure applications, a request to access data can be received via one of the secure applications in which the request is intended for a content provider via a system service. The request intended for the content provider via the system service can be intercepted, as shown at step 310. At step 315, the intercepted request can be modified, which can cause the system service to direct the request back to the secure application instead of the content provider. A connection can be established with the content provider for the request through the secure application to enable data usage accounting of data that is returned by the content provider, as shown at step 320. Additionally, at step 325, content from the content provider can be received at the secure application, and the received content from the content provider can be forwarded to the system service for processing, as shown at step 330. An amount of data that is carried over the established connection associated with the secure application can be determined, as shown at step 335.

Figure 4:
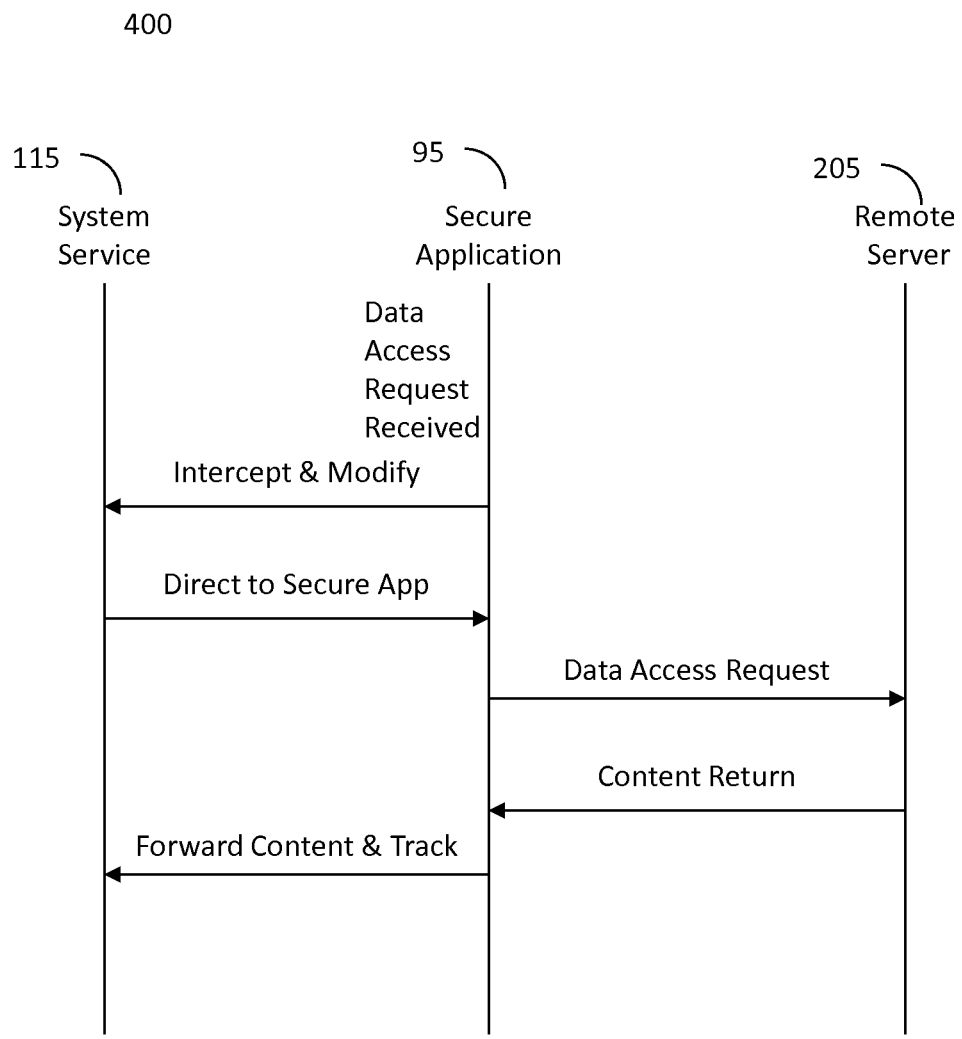
FIG. 4 illustrates an example of an interaction among a secure application, a remote server and a system service.

Referring to FIGS. 1 and 2, a user may wish to access data through, for example, a secure application 95 that is installed on the computing device 15. As an example, the user may desire to retrieve some type of content, such as video, through the secure application 95. The content may need to be retrieved from one of the remote servers 205. Conventionally, the data access request would be passed to the relevant system service 115 and the system service 115 would fetch the content from the remote server 205. Here, however, the data access request may be intercepted prior to being handled by the operating system and can be modified to direct the request back to the secure application 95 (or some other application, process, or location) instead of the remote server 205. Reference will be made to FIG. 4 to help explain this process.

In FIG. 4, an example of an interaction 400 between the secure application 95, the system service 115 and the remote server 205 is shown. In the initial step, the data access request is received and is intercepted and modified. In this example, the data access request is for video that is stored at one of the remote servers 205 that is associated with a website or some other form of digital content, and the system service 115 is a media playback application. As such, in accordance with earlier discussion, the API that is associated with the media playback service can be hooked.

Based on conventional techniques, the uniform resource indicator (URI) related to this data request may be a uniform resource locator (URL) with the associated content available via the hypertext transfer protocol (HTTP) or the hypertext transfer protocol secure (HTTPS). As part of the modification process, the URL may be changed prior to being passed to the system service 115. The modification of the URL, in one embodiment, may be based on a port number that is provided by the operating system. For example, the secure application 95 may create a listening socket on a loopback interface by requesting a socket and port number from the operating system. As is known in the art, the loopback interface can support inter-process or inter-app communications on the computing device 15. The requested port may be a predetermined value or may be simply a request to the operating system to provide an available port number. Continuing with the example, the URL may be converted into a local-host URL that includes the assigned port number and the rest of the information from the original URL. The modified URL may then be passed across to the system service 115, in this case, the media player. As will be explained later, multiple listening sockets and ports may be requested from the operating system as part of this process.

Consider the following specific but non-limiting example. A user may select a link through a secure application 95, which may have the following exemplary URL associated with it:

http://www.youtube.com/watch?v=uWHRqspFke0

As noted earlier, the secure application 95 may request a socket and port value from the operating system, and the port value can factor into the modified URL. In this example, the original URL may be transformed into the following localhost URL:

http://localhost:4444?t=www.youtube.com&p=watch&r=v=uWHRqspFke0

Here, the port value "4444" is now part of the URL string, which can cause the system service 115 to point back to this port created by the secure application 95. In addition, as can be seen, the original hostname can be encoded in the "t=" parameter, the original path can be encoded in the "p=" parameter and the original parameters can be encoded in the "r=" parameter. Thus, the modified URL can include the port value, and the remote information can be added as parameters in the modified URL. A similar example for an HTTPS request will be presented below.

In some arrangements, as part of this process, the secure application 95 can create a proxy when the data is initially requested through the secure application 95. The proxy can act as the intermediary between the system service 115 and the remote server 205. In doing so, the proxy may listen in on any sockets that were created for the overall modification of the data access request. As an example, each secure application 95 can be individually configured to generate the proxy for relevant data requests that it receives.

In another arrangement, the secure application 95 may record a copy of the information associated with the original data request and can map that information to the redirect address that has been created. For example, in the example above, the secure application 95 may record the information associated with the original URL in any suitable database, such as the memory 70 of FIG. 1, and can map this information to the port that was assigned to the modified URL. This way, the secure application 95 can easily determine the original remote server 205 when it receives the modified URL. In an alternative embodiment, the information of the original data request may not need to be stored and mapped to the redirect address. In the URL example, the original information from the URL can simply be obtained from the modified URL because the original information may be part of the modified information.

Moving back to FIG. 4, in the second step, the modified data access request can cause the system service 115 to direct the request back to the secure application 95, instead of the original remote server 205. That is, the system service 115 will establish a connection with the secure application 95 via the port that the secure application 95 created. In view of the mapping process described above, the secure application 95 is able to determine the original data access request and can establish a connection with the relevant content provider, such as an appropriate remote server 205. In particular, based on the example above, the secure application 95 can determine the original URL request and can open a connection with the location specified by the original URL. This process is reflected in the third step of FIG. 4. At this point, the secure application 95 can fetch the content from the remote server 205 and can return this content to the system service 115 for processing, as shown in the fourth step. The user may then consume the requested data similar to a normal session. As will be explained below, there may be scenarios where a similar re-routing process can be performed to enable data usage tracking but without the invocation of a system service 115.

As previously noted, the secure application 95 may be configured to track data usage. In this case, the secure application 95 can determine an amount of data that is carried over the connection that is established with the remote server 205. This can include both incoming (i.e., from remote server 205 to secure application 95) and outgoing (i.e., from secure application 95 to remote server 205) content. For example, the calculation unit 77 of FIG. 1 can work with the secure application 95 to tally the amount of data consumed by this particular session. In addition, because each session associated with this particular secure application 95 can be tracked, a cumulative amount of data usage for the secure application 95 over a certain time period can be determined. This process may also be conducted for all or at least some of the other secure applications 95 that are installed on the computing device 15. As previously mentioned, the data usage associated with the secure applications 95 may also be counted at a location that is remote to the computing device 15.

If the secure applications 95 are associated with an enterprise, the enterprise can determine the amount of data usage that is tied to each of its secure applications 95. This feature can enable the enterprise to determine data usage on the device 15 that is solely attributable to it. As a result, data usage tracking associated with the secure applications can be segregated from data usage that originates from the unsecure applications.

In one embodiment, the connection that is established between the secure application 95 and the remote server 205 can be a secure connection. For example, as is known in the art, the secure application 95 can be configured to establish virtual private network (VPN) connections with remote locations. Such a VPN connection is individual to the secure application 95 and is different from a system-level VPN. If desired, however, the connection between the secure application 95 and the remote server 205 is not required to be a secure connection. In addition, in another embodiment, the secure application 95 may use a system-level VPN.

The description above may apply to other protocols that facilitate the exchange of data. For example, HTTPS traffic may also be tracked in accordance with the procedures presented herein. In one embodiment, additional steps can be taken when dealing with HTTPS traffic to ensure accurate and complete accounting. For example, if a user is accessing an HTTPS link through the secure application 95, the original URL may be modified similar to the HTTP examples above, but the connection between the system service 115 and the secure application 95 may be left in the open.

Consider the following example. If an HTTPS request is generated, the secure application 95 can convert the HTTPS request to an HTTP request when the secure application 95 modifies the URL for purposes of directing the system service 115 back to the secure application 95. That is, the secure application 95 can change the connection type of the data request from a secure connection to an open connection when the data request is modified. Referring back to the URL example above, the following HTTPS URL may be received:

https://www.youtube.com/watch?v=uWHRqspFke0

The secure application 95 can determine that this is an HTTPS request and can modify the URL. An exemplary conversion is presented here:

http://localhost:4444?s=www.youtube.com&p=watch &r=v=uWHRqspFke0

As reflected in the string, the HTTPS request is converted to an HTTP request. As a result, the connection between the system service 115 and the secure application 95 can be out in the open. As will be explained below, this feature can enable the secure application 95 to handle re-directs from the remote server 205.

As can also be seen in the string, the "s=" parameter can provide an indication that the original URL was an HTTPS request. Accordingly, when the secure application 95 establishes the connection between it and the remote server 205, an HTTPS connection can be created. In other words, the system service 115 may not be responsible for establishing the HTTPS connection, and the secure application 95 may be in control of any security-related handshaking and getting the encryption keys in place. The session between the secure application 95 and the remote server 205 can be a transport layer security (TLS) connection, which can terminate at the secure application 95.

As explained earlier, the secure application 95 may be configured to arrange VPN connections in an individual manner. Such an application-level VPN can support any type of traffic that is exchanged between the secure application 95 and the remote server 205, including both HTTP and HTTPS streams. In other words, the ability of the secure application 95 to provide an application-level VPN does not impede the ability of the secure application 95 to modify data access requests and then convert them back to their original form, as described above. Further, these techniques can be practiced if the secure application 95 is using a system-level VPN or is not relying on a VPN connection at all.

As is known in the art, some initial data access requests are answered with a re-direct, which instructs the requesting source to another destination to retrieve the desired content. For example, in the case of an HTTP request, the requesting device may receive an HTTP re-direct from the server, which causes the device to generate another HTTP request based on the re-direct destination. In addition, in some cases, a URL playlist may be sent from the server, which may include a plurality of URLs. This particular feature may support HTTP live-streaming, a protocol that enables a client to select from a number of different alternate streams containing the same material encoded at a variety of data rates, which can allow the streaming session to adapt to the available data rate.

In one arrangement, the secure application 95 may be configured to account for these re-directs. For example, if the initial data request is an HTTP request and the remote server 205 returns an HTTP re-direct, the secure application 95 may transform that HTTP re-direct in accordance with the modification process described above. By doing so, the secure application 95 can ensure that the system service 115 establishes the new re-direct connection with the secure application 95. As such, when the secure application 95 detects a re-direct, the secure application 95 can request another socket and port from the operating system to account for the new destination that originates from the re-direct. The secure application 95 can then open a connection between itself and the new (and appropriate) remote server 205. This process can be expanded to account for re-direct playlists, such that socket/port pairs are generated when needed for the URLs that make up the playlists.

As can be gleaned from this example, the secure application 95 may be required to detect the re-directs in the incoming streams. If the original data access request is not based on a secure protocol, like HTTPS, then the secure application 95 is easily able to detect the re-directs. If the original request is based on a secure protocol, however, complications may arise because the traffic being streamed to the system service 115 may be encrypted. As noted above, when dealing with a secure protocol, the termination point for the secure connection can be placed at the secure application 95, not the system service 115. As a result, the secure application 95 can decrypt the incoming traffic and can detect the re-directs, similar to how it would for an unsecure protocol. Thus, as an example, re-directs can be handled for both HTTP and HTTPS.

In some cases, other components may assist in the calculation of data for purposes of usage accounting. For example, some system services 115 may offer notifications based on certain events that may be related to data usage. In one particular example, the secure applications 95 can register for certain callbacks from the system services 115 that are equipped to provide such notifications. As an example, if a data session is initiated through a secure application 95, the system service 115 can provide one or more notifications that inform the secure application 95 of the start of the session and its eventual ending. Statistics related to the amount of data that was consumed during the session can be incorporated into the notifications, which the secure application 95 can use to track its data usage. The overall total usage related to all or at least some of the secure applications 95 can be determined, which can allow the segregation of data consumption between secure and personal profiles, as described earlier. In this case, however, the modification of the data access requests is not required, and the system service may fetch data in its conventional manner. When available with the system services 115, this feature may be useful for data accounting, particularly when application-level VPNs are not incorporated into the secure applications 95.

The description herein has been presented primarily in terms of a secure application 95 handling the modification of data requests and the data usage tracking. The description, however, is not so limited. In particular, these features can be implemented into an unsecure application or some other application or process such that data usage can be tracked for these types of applications/processes on an individual basis. Similarly, the system service that is involved in this process is not limited to a media player. In fact, any system service that is involved in the exchange of data with a remote location may be applicable to the description provided herein. For example, other system services that apply here may include a texting application, a dialer or any other application that facilitates or otherwise supports voice communications, a video or camera application, or a map application or other application that supports mapping features. In fact, the description herein may apply to any type of application, whether secure or unsecure, that may involve the consumption of content or the use of services in which it may be necessary to distinguish between personal use of such content and services and secure or workspace or enterprise use of the content and services. No matter the type of application involved, any type of a redirect of data session requests may be performed to enable the segregated accounting.

In some cases, it may not be necessary to invoke the system service 115 to handle a request for a data session. That is, the request for the data session may not require the launching of a separate application to handle the request. For example, the secure application 95 may be a secure web browser, through which a user may attempt to retrieve some data. As is known in the art, in prior art cases, an application may work with the operating system of a computing device to establish a connection to an external entity, such as a web server. In a typical mobile device setting, the application may be configured to generate calls for an application programming interface (API) defined by the portable operating system interface (POSIX). In response, the operating system can establish a connection to the external entity on behalf of the application.

Similar to the description above, techniques can be implemented that enable secure applications 95 to have such calls natively redirected back to them (or some other application, process, or location) for the purpose of establishing a connection with the appropriate external entity and for enabling an accounting of the data session. This process can also make possible a scheme in which data usage for secure applications 95 is counted separately from that associated with unsecure applications 90.

Figure 5:
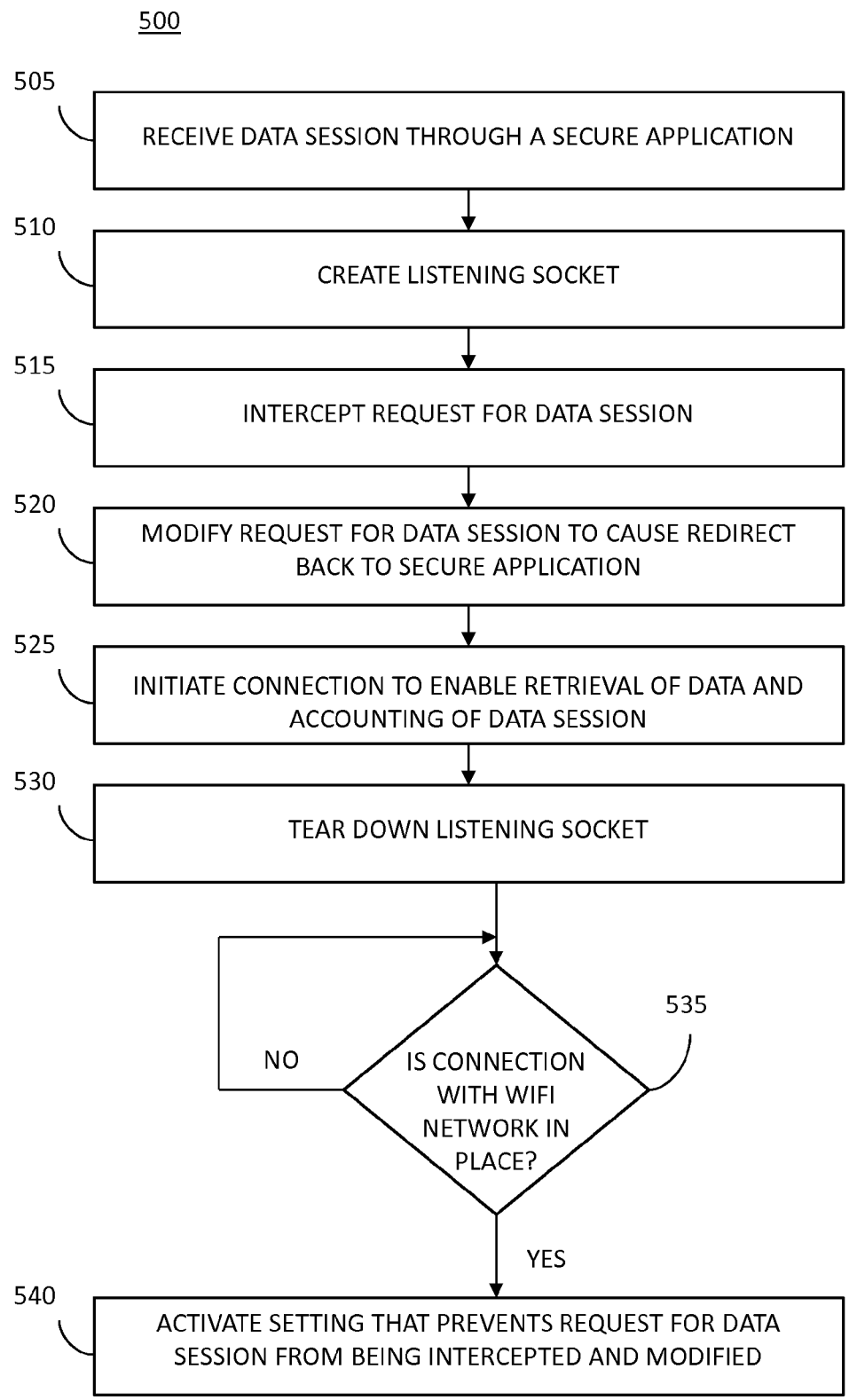
FIG. 5 illustrates another example of a method for enabling data usage accounting.

Referring to FIG. 5, a method 500 for enabling data usage accounting is shown. The method 500, however, may include additional or even fewer steps or processes in comparison to what is illustrated in FIG. 5. Moreover, the method 500 is not necessarily limited to the chronological order that is shown in FIG. 5. In describing the method 500, reference may be made to the drawings attached hereto, although it is understood that the method 500 may be practiced with any other suitable systems and components and may take advantage of other suitable processes.

At step 505, a request for a data session can be received through a secure application, and at step 510, in response, a listening socket can be created. The request for the data session can be intercepted, as shown at step 515, and the request for the data session can be modified to cause the request to be re-directed back to the secure application, as shown at step 520. At step 525, a connection can be initiated to enable retrieval of the data in response to the request and an accounting of the data session. At step 530, the listening socket can be torn down. In addition, at decision block 535, it can be determined whether a connection with a Wi-Fi network is in place. If no, the method 500 can resume at decision block 535. If yes, a setting can be activated that prevents the request for the data session from being intercepted and modified, as shown at step 540.

Figure 6:
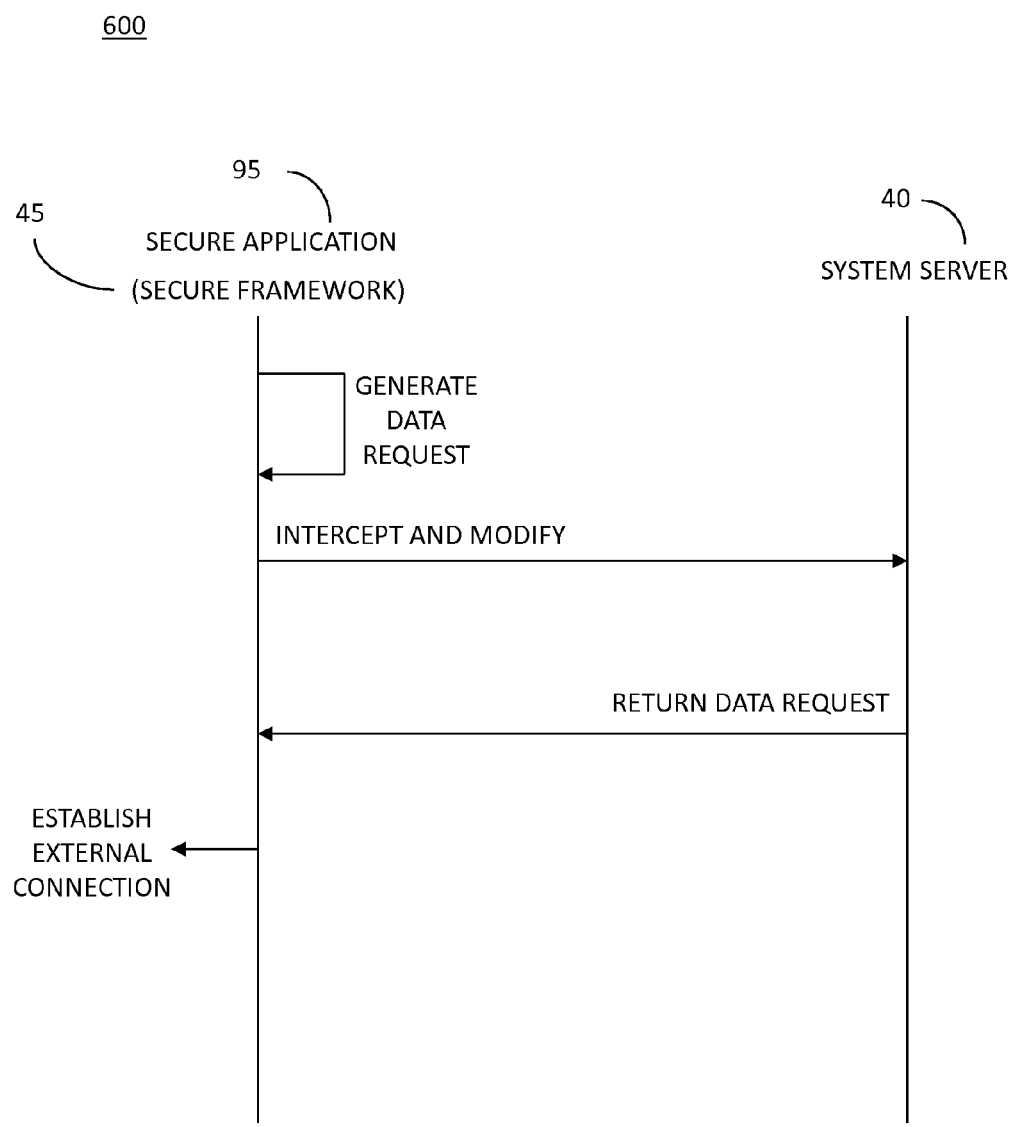
FIG. 6 illustrates an example of an interaction between a secure application and a system server.

To help explain the method 500, reference will be made to FIG. 6, which presents an example of an interaction 600 between a secure application 95 and the system server 40 with the secure framework 45 facilitating the operation. Although the secure framework 45 may be considered part of and can work in conjunction with the secure application 95 to carry out the operations described herein, reference may in some cases be made solely to the secure application 95 when explaining this interaction 600 for purposes of convenience. Initially, a user may be interacting with the secure application 95, and the user may wish to retrieve some content from, for example, an external entity. As noted earlier, the computing device 15 may have both secure applications 95 and unsecure applications 90 installed thereon.

In response to the user interaction, the secure application 95 may generate a request for a data session. As an example, the request may be a POSIX connect call, although the principles outlined herein are not limited to such an arrangement. This request may include addressing information that is intended to be used to establish the connection with the external entity. Examples of addressing information include the following arguments: socket (specifies the file descriptor associated with the socket); address (points to a sockaddr structure containing the peer address); and address_len (specifies the length of the sockaddr structure pointed to by the address argument. Other exemplary arguments and parameters may also be applicable here. In addition, the term "addressing information" is defined as data that is configured to facilitate or enable a connection with one or more destinations. This request may be from the secure application 95 or the system framework associated with the secure application 95. In either case, in response, the secure application 95 can generate a listening socket on the loopback interface—similar to the procedures previously described. In one arrangement, the listening socket can be a temporary socket in that it can be torn down once it serves its purpose of establishing a connection through the secure application 95.

Once the listening socket is created, the secure application 95 can intercept the request for the data session. This interception can occur because the secure framework 45 can be shimmed between the system framework and the operating system and can be configured to recognize predetermined calls for modification or other processing, while allowing others to pass unfettered. In any event, the data session request can be modified by re-writing portions of the request based on the newly-created listening socket. For example, the addressing information of the connect call may be re-written with the addressing information associated with the listening socket. As shown in FIG. 6, the modified data session request can then be passed to the system server 40. This modified call may still be in the native format, or in the form that is normally used by the secure application 95 and other applications on the computing device 15 to make calls to the operating system. That is, the native version of the relevant function can be called at this stage, where it is modified to include the new addressing information for the listening socket.

As part of the modification process, the original addressing information (or at least some portion of it) can be stored and assigned to the listening socket. The original addressing information includes the final destination address and can be used to establish the intended connection, as will be explained below. As another part of this process, a return can be generated to inform the system framework or the secure application 95 that the requested connect is in progress.

When the operating system receives the data session request, the operating system can redirect the data session request back to the secure application 95, as opposed to the intended final destination address. In particular, the data session request is returned to the listening socket based on the re-written addressing information that replaced the original addressing information. In this case, the operating system can wire up a connection between the relevant socket of the secure application 95 and the listening socket through the loopback interface. Once the redirected connection is established on the listening socket, the secure application 95 can retrieve the original addressing information and can initiate and establish the connection with the external entity, using the original addressing information. Specifically, a connect socket can be generated, and this connect socket can be used to establish a connection with the appropriate socket of the external entity. Further, once the connection with the intended external entity has been initiated (or completed), the secure application 95 can tear down the listening socket to return system resources.

In this case, similar to the process associated with the system service redirection described above, the redirection here can be transparent to the secure application 95 or the system framework. That is, no changes are required to be made to the secure application 95 or the system framework to enable the interception and modification of the data session request. These objects can continue to make their native calls when seeking to exchange data with an external entity, and they are unaware that their calls are being manipulated in this manner. The terms "transparent redirection of a request" or "transparently redirecting a request" are defined as a redirection of a request in which the source of the request is unaware of its redirection, and examples of a request include a call, command or function. The terms "native redirection of a request" or "natively redirecting a request" are defined as a redirection of a request in which the source of the request maintains its reliance on native or pre-existing protocols or structure to generate or to facilitate the request.

The connection between the secure application 95 and the external entity may support various types of formats or protocols. In some cases, the connection to the external entity may be through an application-level virtual private network (VPN), as the secure application 95 or some other application or process may be configured to provide such a feature. The connection may also utilize a system-level VPN, if desired. In this case, the socket of the external entity can be the appropriate socket of the VPN, as opposed to a native socket for the back-end location. Moreover, the connection with the external entity is not necessarily limited to being a secure connection, as unsecure connections may be used.

As noted earlier, the computing device 15 in which the previously described techniques may be practiced may include a Wi-Fi communications stack. The Wi-Fi stack can enable the device 15 to exchange data with external entities over a Wi-Fi network using any of the protocols within that family for which the device 15 is configured. In some cases, it may not be necessary to track data usage associated with secure applications 95 (or even unsecure applications 90) when the device 15 is camped on a Wi-Fi network. In fact, it may not be necessary to do so when the device 15 is operating on any non-cellular network or other networks that do not bill users for access. In this instance, when the device 15 is using a Wi-Fi network or other non-billable or free network for data access, a setting in the device may be activated to prevent the process of redirecting data access requests. That is, because users are typically permitted to access Wi-Fi networks for free, it may not be necessary to track data usage when the device 15 is using such a network, thereby obviating the need to intercept and modify the data access requests in accordance with the processes described above. When the computing device 15 leaves the Wi-Fi network and returns to the billing network, the setting can be deactivated, and the process of data usage counting can begin again.

In another arrangement, the tracking of data usage may be limited to a particular network, such as a predefined cellular network. Thus, the processes described herein may only be executed on this predetermined network. When the computing device 15 is operating on any other network, the redirection process may not be carried out. For example, if the computing device 15 is roaming on a network, or operating on a network that is not its home network, the setting that prevents the redirection process may be activated, even though use of the roaming network may cause the user to incur data usage charges. Nonetheless, if desired, data usage tracking based on the techniques described herein may be conducted on roaming networks or Wi-Fi or other free-access networks.

Figure 7:
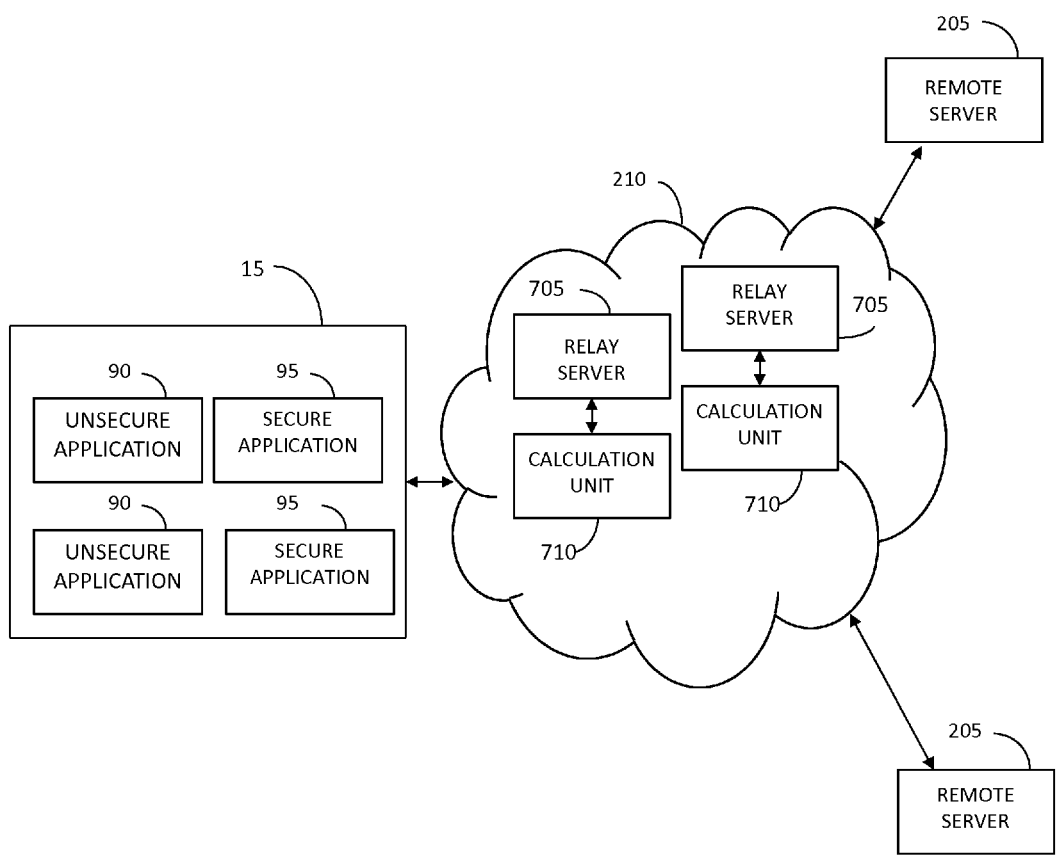
FIG. 7 illustrates an example of a system that shows the computing device of FIG. 1 in communication with one or more relay servers and one or more remote servers.

As previously noted, the counting or calculation of data can be performed at a location that is remote to the computing device 15. For example, an arrangement may be configured in which certain data sessions are facilitated by a remote relay to enable data tracking at the relay or some other suitable location. Referring to FIG. 7, an example of a system 700 that enables data usage accounting through a relay is illustrated. The system 700 can include one or more computing devices 15—which may have both unsecure applications 90 and secure applications 95 installed thereon—and one or more remote servers 205. The remote servers 205 and the computing devices 15 may exchange various forms of data with one another. Similar to FIG. 2, one or more networks 210 may facilitate the exchange of data between the computing devices 15 and the remote servers 205. The network(s) 210 may be composed of various types of components to support wireless or wired communications (including both). The network(s) 210 may also be configured to support local or wide area communications (or both).

In one arrangement, the network 210 may include one or more relay servers 705, and at least some of the relay servers 705 may include a calculation unit 710. The calculation unit 710 may be a part of the relay server 705 or may be an independent component that is communicatively coupled to the relay server 705. In either case, connections may be established between any of the relay servers 705 and any of the computing devices 15 and between any of the relay servers 705 and any of the remote servers 205. As will be explained further below, when such connections are established, the data that is transferred between the computing devices 15 and the remote servers 205 may be calculated or counted, such as by the appropriate calculation units 710. To enable the segregation of data usage accounting between enterprise and personal use, such tracking may only be conducted for secure applications 95 or other processes or applications associated with the enterprise and not the user's personal activities. To accommodate this remote tracking, the enterprise data requests may be redirected to the appropriate relay servers 705 as described herein or in accordance with other suitable redirection techniques.

As mentioned above, there may be numerous networks 210 involved to handle the exchange of data between the computing devices 15 and the remote servers 205. The relay servers 705, however, may be associated with a predetermined network, such that the computing device 15 is directed to a server 705 in this particular network 210. Moreover, the use of the relay servers 705 (and hence, the calculation units 710) may be selective in nature. For example, this arrangement may only be utilized for secure applications 95 and when the computing device 15 is camped on a certain network 210 for service, such as a predetermined cellular network.

Figure 8:
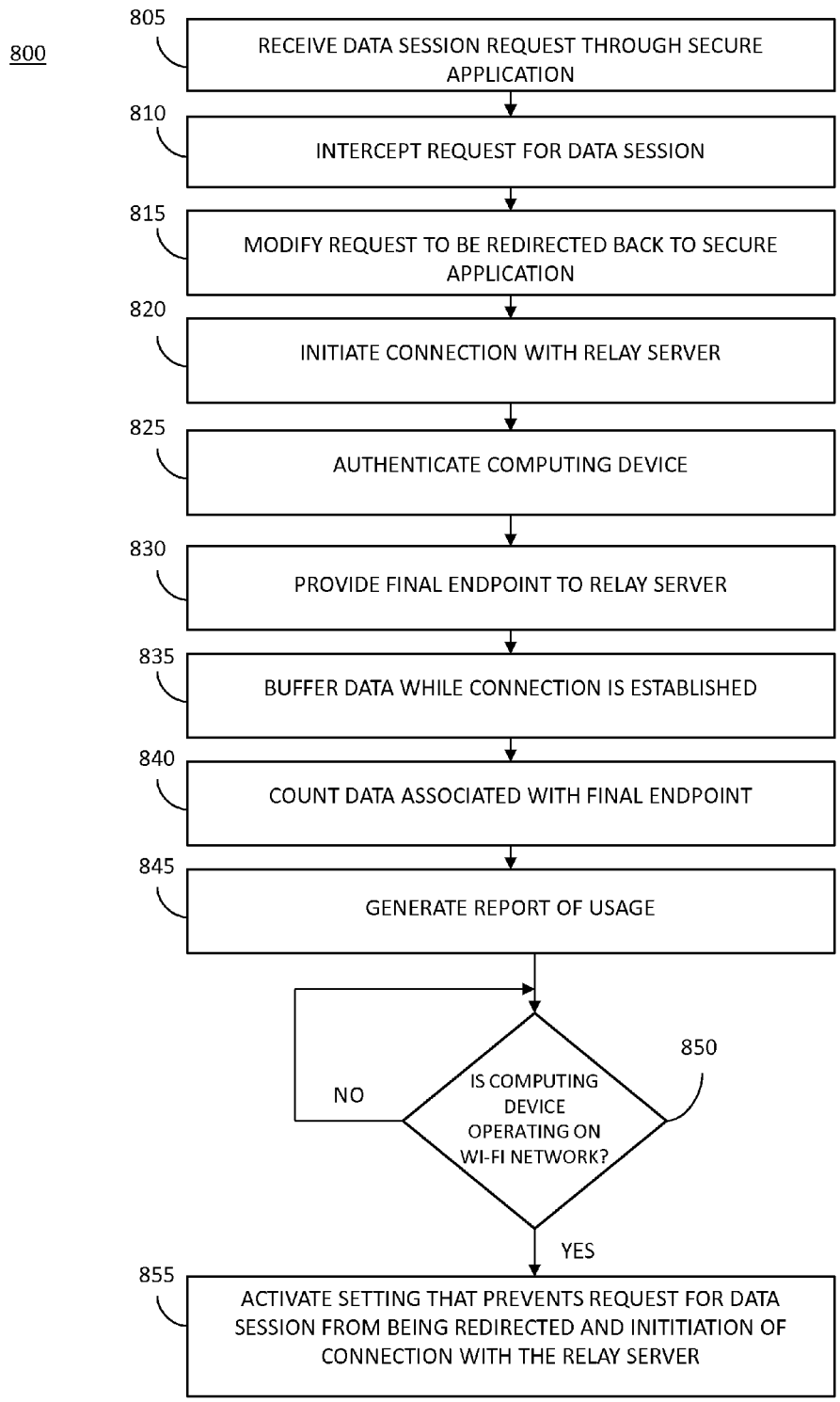
FIG. 8 illustrates an example of a method for data usage accounting through a relay.

Referring to FIG. 8, a method 800 of enabling data usage accounting through a relay is illustrated. The method 800, however, may include additional or even fewer steps or processes in comparison to what is illustrated in FIG. 8. Moreover, the method 800 is not necessarily limited to the chronological order that is shown in FIG. 8. In describing the method 800, reference may be made to the drawings attached hereto, although it is understood that the method 800 may be practiced with any other suitable systems and components and may take advantage of other suitable processes.

At step 805, on a computing device that has secure applications and unsecure applications installed thereon, a request for a data session can be received through a secure application. The request may include a final endpoint. At step 810, the request for the data session can be intercepted, and the request can be modified to cause the request to be redirected back to the secure application, as shown at step 815. At step 820, a connection can be initiated with a relay server instead of the final endpoint such that data usage accounting for the data session is to be conducted at a remote location.

In addition, at step 825, the computing device can be authenticated with the relay server prior to permitting data exchange between the secure application and the relay server. At step 830, the final endpoint can be provided to the relay server to enable the relay server to establish a connection with the final endpoint. At step 835, data from the secure application may be buffered while the connection with the relay server or the final endpoint is being established. Data associated with the final endpoint may be counted such that a data usage amount is determined for the requesting secure application, as shown at step 840. At step 845, a report can be generated that details the data usage of the secure applications installed on the computing device. Additionally, at decision block 850, it can be determined whether the computing device is operating on a Wi-Fi communication network. If not, the method 800 can resume at decision block 850. If yes, in response to such a determination, a setting can be activated that prevents the data session request to be redirected back to the secure application and the initiation of the connection with the relay server, as shown at step 855.

Figure 9:
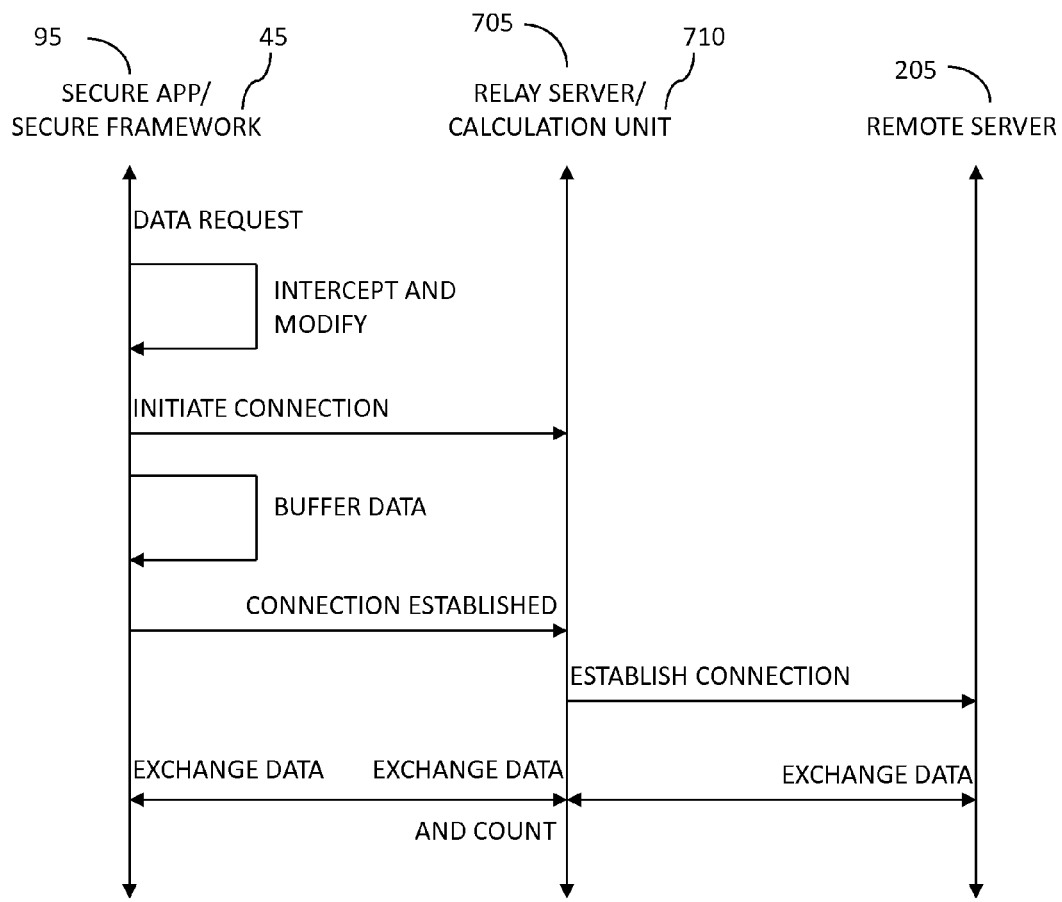
FIG. 9 illustrates an example of an interaction among a secure application, a relay server and a remote server.

To help explain the method 800, reference will be made to FIG. 9, which shows an example of an interaction 900 among a secure application 95 (along with the secure framework 45), a relay server 705 (and calculation unit 710) and a remote server 205. As previously explained, the secure framework 45 may be considered to be part of the secure application 95, and the calculation unit 710 may be part of the relay server 710, although other suitable arrangements may apply to these principles.

As an example, a user may initiate a data session request through a secure application 95 or other application, which may be intercepted and modified to be redirected back to the secure application 95. This process may be similar to the exemplary techniques described above with respect to re-writing URLs and addressing information. That is, the secure application 95, via the secure framework 45, may set up a listening socket on a loopback interface, and the relevant data can be re-written to cause the request to be redirected to the listening socket. Here, however, the secure application 95 can initiate a connection with the relay server 705. The relay server 705, which can be any suitable combination of hardware and software, can be used to initiate and establish a connection with the final endpoint of the data session request, which may be the remote server 205.

For example, when the data session request is intercepted, the secure application 95 can re-write the addressing information of the request with the addressing information of the listening socket of the loopback interface and can store the replaced addressing information. The stored addressing information may be the addressing information of the final endpoint. As before, a return can be generated to inform the system framework or the secure application 95 that the requested connect is in progress. When the operating system establishes the connection between the socket of the secure application 95 and the listening socket, the secure application 95 may then generate an accepted or connected socket. The connected socket may enable data to be passed to and from the secure application 95 through the loopback interface. As an example, after the connected socket is generated, the listening socket may be torn down to preserve system resources, although such a step may be bypassed in other circumstances.

In one arrangement, when the connection is accepted on the listening socket, the secure application 95 may generate a back-end socket for initiating and establishing the connection with, for example, the appropriate relay server 705, which may be listening for connections on its public IP address. As part of initiating the connection with the relay server 705, the connection protocol with the relay server 705 may be negotiated, which may include authentication of the computing device 15 or some other process, service or component that is part of the device 15. As an example, the IP address of the computing device 15 may be provided to enable the authentication of the device 15.

While the connection between the secure application 95 and the relay server 705 is being negotiated, any data that may be generated by the secure application 95 may be buffered, at least until, for example, the connection with the relay server 705 is established. In particular, the connection between the relevant socket of the secure application 95 and the connected socket of the loopback interface may be operatively the same as a connection with a final endpoint. In view of this connection, a one-to-one mapping between the socket of the secure application 95 and the connected socket may exist. As such, the secure application 95 may behave naturally and to support this feature, any portion of the data generated by the secure application 95 during the negotiation with the relay server 705 can be saved for eventual transmission to the relay server 705.

In one arrangement, once the connection with the relay server 705 is established, the secure application 95 can send the final endpoint of the data session request to the relay server 705. For example, the secure application 95 may, in accordance with the protocol of the relay server 705, package the addressing information of the final endpoint as part of a payload for the relay server 705. In one arrangement, any buffered data from the secure application 95 may be sent to the relay server 705. The relay server 705 can establish the connection with the remote server 205 (i.e., final endpoint) on behalf of the secure application 95. If necessary, the relay server 705 may also buffer data during its negotiation with the remote server 205. Once the connection is established between the relay server 705 and the remote server 205, data exchanges may occur between the secure application 95 of the computing device 15 and the remote server 205, via the relay server 705. In an alternative arrangement, the buffered data may be held at the computing device 15 until the connection between the relay server 705 and the remote server 205 is completed.

Eventually, the data session may end, either through the secure application 95, the relay server 705, the remote server 205 or some other process or component. In either case, the components/processes may tear down the connections and release any relevant system resources. As an example, the secure application 95 may close the loopback interface (and any associated sockets) in the event the session is completed. These principles may also apply in the event that any of the connections are unable to be established in response to the initial request.

As noted previously, uniform resource locators (URL) may be re-written, particularly in the case of calls being made to a system service 115. The process of establishing the connection with the relay server 705 and the remote server 205 is similar to that described above. In this case, however, during the time the connection with the relay server 705 is being established, the secure application 95 can perform a domain name system (DNS) look-up of the original host name to determine the appropriate IP address for the final endpoint. Once the IP address is retrieved and the connection with the relay server 705 is established, the secure application 95 can provide the IP address as part of the addressing information that is packaged and sent to the relay server 705. That is, the re-written URL may be resolved into an address that can be used to establish the connection with the appropriate remote server 205 through the relay server 705.

In either arrangement, any data that is exchanged between the secure application 95 and the remote server 205 may be routed through the relay server 705. As such, the relay server 705 can be configured to facilitate the remote tracking of data usage for the secure application 95 for this exchange, as well as other sessions in the future. For example, the calculation unit 710 may determine the data usage for the secure application 95, as well as other secure applications 95, and can generate one or more reports that indicate the details of such usage. As an example, the data usage can be correlated with a particular computing device 15 through the received IP address of the device 15. The report can include usage totals on an individual or group basis for any number of secure applications 95. These reports may then be disseminated to the relevant parties for purposes of billing.

As illustrated here, a relay scheme can be leveraged to enable remote data counting for the computing device 15. There are other alternatives, however, that may apply. For example, the counting of the data based on the exchanges with the external entity may be performed at the computing device 15, such as through the secure application 95 that requested the session or a hub application 120 (see FIG. 1). Moreover, the calculation units 710 may not necessarily be at the same location as the relay servers 705, as the units 710 may be remote to both the computing device 15 and the relay servers 705. In addition, any number of calculation units 710 may be associated with any number of relay servers 705. In fact, these components may be grouped together in any suitable fashion. For example, any number of relay servers 705 and calculation units 710 may be grouped together for an enterprise in which the users of the computing devices 15 being tracked are associated with the enterprise, such as employees of the enterprise. These groupings may be isolated from one another to prevent comingling of data streams associated with different enterprises to ensure accurate billing.

As explained earlier, this process of establishing a connection with a relay server 705 to enable data exchange with a final destination and for tracking and counting the data associated with such sessions may be restricted to secure applications 95 or enterprise applications, such as those installed on the computing device 15. As such, this procedure may not be performed for any data sessions associated with unsecure applications 90 or personal applications. Because the secure applications 95 may likely be associated with or sponsored by an enterprise, the process presented here can allow for separate data usage charges for the computing device 15 with respect to a user's personal data and that affiliated with, for example, the user's employer. Of course, such an arrangement may be implemented for any application, including individual applications or for certain groups of applications, and may not necessarily be limited only to secure applications 95.

In another arrangement, the process of establishing the connection with the relay server 705 as described above may be transparent to the secure application 95. As another example, this connection may be based on a protocol that is non-native to the secure application 95. As is known in the art, a secure application 95 is created from a target application that is typically available to one or more parties for download, such as through an app store or some other electronic storefront. The original portions of the target application that make up the secure application 95 may be unaware of the connection with the relay server 705 and such portions may continue to make calls in their native formats. This principle also applies to the system framework. The secure framework 45 of the secure application 95, however, may be configured to abstract the necessary calls and protocol associated with establishing the connection with the relay server 705. As such, the original developer is relieved of having to change any of the original code to facilitate the relaying arrangement or to operate in accordance with the non-native protocol of the relay server 705.

In one embodiment, the protocol for the connection to the relay server 705 can be configured to traverse firewalls or other security features to permit access to protected internal resources. For example, this connection may be based on a layer 4 solution (transport) per the open systems interconnection (OSI) model, as opposed to tunneling or networking technologies associated with layer 3 of the OSI model. This arrangement reduces the complexities of the connection because there are no addressing resolution issues, as would be the case for a VPN solution. That is, the transport layer solution obviates the need to deploy a networking infrastructure, and the non-native protocol can be resolved by the secure framework 45. Almost any type of data may flow over the relay connection, as well, including encrypted and unencrypted traffic. Of course, other connection types or protocols may be used here, including VPN connections.

The secure application 95 may be configured to connect to an external entity in multiple ways. For example, the secure application 95 may use blocking or non-blocking sockets or transmission control protocol (TCP) or user datagram protocol (UDP) connections. The solutions presented here can accommodate all or at least a portion of the possible ways a secure application 95 may be designed to connect to the external entity. That is, the secure framework 45 may be constructed to intercept the various networking calls of the secure application 95 and to perform the redirects and connection-initiation with the relay server 705 in accordance with the protocol of the relay server 705, as described above. Thus, in one arrangement, a plurality of predetermined disparate networking calls or functions of the secure applications 95 that are based on various connection modes may be identified. These calls or functions may then be manipulated when they are activated in accordance with the descriptions above to permit data exchange over a relay connection that is based on a single connection mode.

As noted earlier, any suitable application may take advantage of the techniques described herein to enable segregated data usage accounting. In fact, any application that can have its data sessions redirected for such data usage accounting may use these solutions. Also, the enterprise data streams may be redirected in accordance with other suitable methods to enable the remote calculation of the consumed data, including through the secure application 95, some other enterprise application, a personal application, or any other process.

In some cases, the execution of this relaying process may hinge on the type of network to which the computing device 15 is connected. For example, if the computing device 15 is camped on a Wi-Fi network or some other public, private or free access network, a setting may be activated that prevents the data session request from being redirected back to the secure application or the initiation of the connection with the relay server 705, or both. In addition, the relaying process may only be conducted if the computing device 15 is camped on a predetermined network, such as its home cellular network. As such, if the device 15 is roaming, the setting described above may be activated. Of course, these embodiments are not meant to be limiting, as the techniques presented here may be applicable to any one of the networks with which the computing device 15 may conduct communications.

As can be seen above, the data session requests that originate from the enterprise applications may be requests for content from commercial content providers (e.g., YouTube) or other sites that are available for access by the public. That is, the data access or session request may be directed to web sites or other destinations that are outside a protected environment of an enterprise with which the user of the computing device may be associated. This open access may increase the user's efficiency because the user can access information or content from sources with which the user is familiar. Of course, as presented herein, the data exchanged as a result of the request may be tabulated separately from the personal applications on the user's device and any resultant charges may be applied to the enterprise. Even though this type of access may extend beyond a controlled environment, like an enterprise's internal network(s), the enterprise may still take steps to protect itself. For example, the enterprise may blacklist or otherwise bar certain web sites from being accessed through the enterprise applications. Moreover, usage limits may also be imposed on the enterprise applications, either individually or as a cumulative grouping. In any event, the user may be provided with the freedom to exchange content with final destinations that are not under the control of the enterprise or within or contained by a protected network set up by or for the enterprise.

Figure 10:
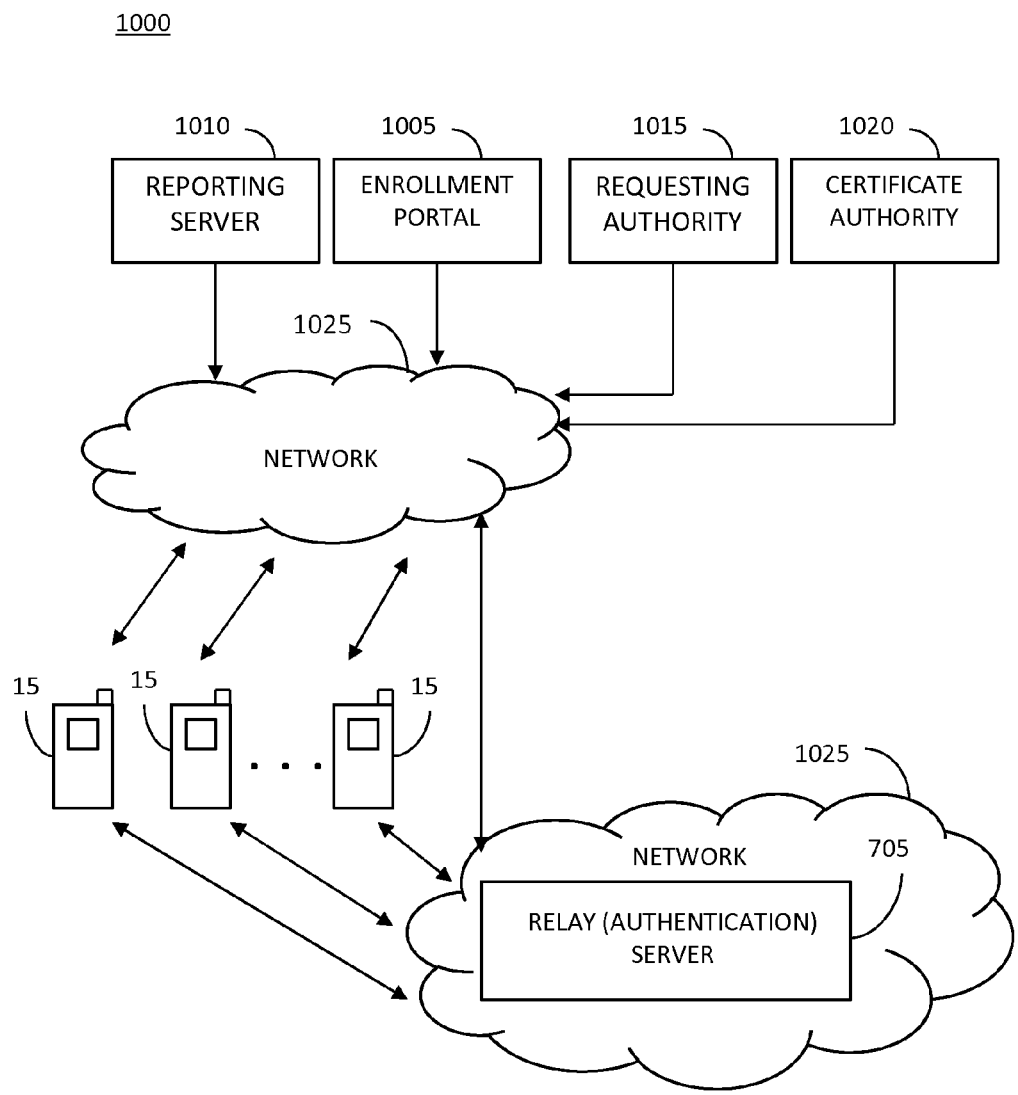
FIG. 10 illustrates an example of a system for enrollment and authentication of a computing device for data usage accounting.

As presented above, data associated with secure applications 95 may be tracked and calculated separately from that associated with unsecure applications 90, such as through the relay server 705. To facilitate this technique, it may be necessary to enroll the relevant computing devices 15 and to authenticate them. Referring to FIG. 10, an example of a system 1000 that can be used for such a purpose is shown.

The system 1000 can include one or more enrollment portals 1005, one or more reporting servers 1010, one or more requesting authorities 1015, one or more certificate authorities 1020, one or more networks 1025 and one or more computing devices 15. The computing devices 15 here may be similar to those previously described. For example, the computing device 15 may include both secure applications 95 (or other enterprise applications) and unsecure applications 90. In addition, the networks 1025 may be configured to facilitate communication exchange—wireless and/or wired—between or among any number of the components shown here. In one particular example, at least one of the networks 1025 may be similar to the system 700 of FIG. 7 in which data sessions of a computing device 15 may be redirected and routed through a relay server 705 for purposes of data exchange and accounting, as presented earlier.

In one arrangement, the enrollment portals 1005 may be configured to facilitate the enrollment of the computing devices 15 for participation in a data accounting program, and the reporting servers 1010 may be configured to handle reporting of errors or other operational parameters or record-keeping. In another embodiment, the requesting authorities 1015 may be designed to obtain signed certificates and/or other authentication data from the certificate authorities 1020 on behalf of the computing devices 15. The system 1000 is merely an exemplary arrangement, as other systems and components and the way they are set up may be applicable to the description herein.

In some embodiments, the relay server 705 may be considered an authentication server. In such a case, the relay server 705—in addition to the functions illustrated above—may perform authentications of the computing devices 15 of the system 1000. This authentication may occur prior to data being exchanged between the devices 15 and the relay server 705. In other cases, the authentication server may be a separate and distinct component. In this example, the authentication server may work in tandem with the relay server 705 to carry out the processes described herein. The description herein is intended to apply to either case.

Figure 11:
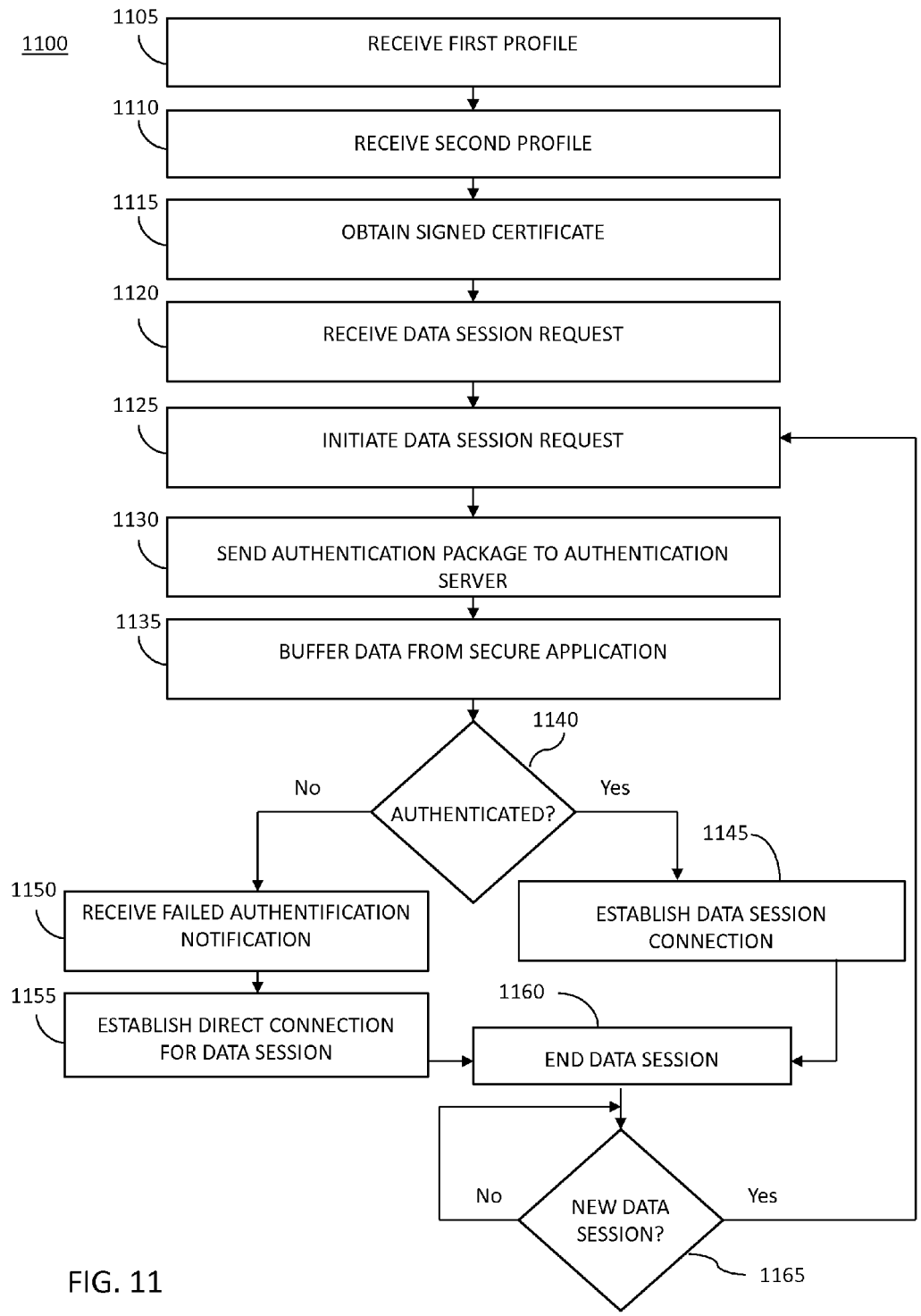
FIG. 11 illustrates an example of a method for enrolling and authenticating computing devices for data usage accounting.

To help explain the operation of the system 1000, reference will be made to FIG. 11, which shows a method 1100 for enrollment and authentication of a computing device for data usage accounting. The method 1100 may include additional or even fewer steps or processes in comparison to what is illustrated in FIG. 11. Moreover, the method 1100 is not necessarily limited to the chronological order that is shown in FIG. 11. Although the method 1100 is linked to the system 1000, the method 1100 may be practiced with any other suitable systems and components and may take advantage of other suitable processes.

At step 1105, a first profile that is configured to enable the computing device to generate a certificate to be signed by a trusted authority can be received. At step 1110, a second profile can be received in which the second profile includes an exclusion list that identifies one or more secure applications installed on the computing device for which the data usage accounting is not to be performed. In response to the receipt of the first profile, a signed certificate may be obtained, such as from a certificate authority, as shown at step 1115. At step 1120, a data session request can be received for a secure application, which may be installed on a computing device that includes both secure applications and unsecure applications. At step 1125, a data session connection can be initiated in response to the data session request. As part of initiating the data session connection, an authentication package uniquely associated with the computing device can be sent to an authentication server, as shown at step 1130.

While the computing device is being authenticated, data from the secure application associated with data session request can be buffered, as shown at step 1135. At decision block 1140, it can be determined whether the computing device has been authenticated. If so, the data session connection may be established to enable data exchange and data accounting, as shown at step 1145. In some cases, the authenticating may be performed exclusively for the secure applications. As another example, the process of initiating the data session request, sending the authentication package and establishing the data session connection may be performed transparently with respect to the secure application associated with the data session request. If the authentication fails, at step 1150, a failed authentication notification may be received in response to providing the authentication package, and at step 1155, a direct connection for the data session request can be established such that the intended data usage accounting will not occur. In either case, the data session for the secure application may eventually end, as shown at step 1160.

At decision block 1165, it can be determined whether a new data session request has been received for the secure application. If not, the flow may resume at decision block 1165. If a new request has been received, the flow may resume at step 1125, where a new data session may be initiated.

Initially, a computing device 15 may need to be enrolled in a program to enable a separate billing scheme, such as that previously described herein. As an example, when a computing device 15 is registered with the enrollment portal 1005, the enrollment portal 1005 can push one or more profiles to the computing device 15. One of the profiles may be a certificate profile that can be configured to enable the computing device 15 to generate a certificate to be signed by a trusted authority, such as the certificate authority 1020. As a specific example, the certificate profile may be a Simple Certificate Enrollment Protocol (SCEP) profile, which may define key length and the algorithms for a certificate that may be unique to the computing device 15. As part of making the certificate unique to the computing device 15, information that is exclusive to the computing device 15 may also be used to generate the certificate, such as a tenant identification (ID) and a managed device instance (MDI) key. In one arrangement, the MDI key may be an identification number that may be used to keep track of managed devices, while the tenant ID may be assigned to an enterprise with which the computing device 15 is associated, such as by having applications or other data related to the enterprise installed on the device 15. Of course, other information may be used for this purpose, such as any suitable unique identification string(s) that may identify the device 15 and any tenant with which the device 15 may be associated.

Another profile that may be sent to the computing device 15 may be a data plan profile. For example, the data plan profile can include destination information, such as a network location, for the authentication server or some other component for the authentication of the computing device 15 for data exchange and accounting. The data plan profile may also contain an application exclusion list and a default list. For example, the application exclusion list may indicate which applications (e.g., secure applications 95, unsecure applications 90 or both) that may be installed on the computing device 15 are not to undergo the process of enrollment, authentication and/or routing through the relay server 705. This feature may be useful in the case of applications that may be ill-equipped to handle the required routing or for those applications for which data accounting may be unnecessary. Any application may be part of the exclusion list. In addition, the data plan profile may include an inclusion list, which can list the applications that are authorized or identified as being suitable for enrollment, authentication and/or routing through the relay server 705. The exclusion list and the inclusion list are not necessarily exclusive, meaning that both lists may or may not be delivered to the computing device 15.

As an example, the default list may identify one or more default network locations that are configured to perform the data usage accounting in which the computing device 15 may be configured to give selective priority to the default network locations. For example, there may be multiple authentication servers in position in the network 1025, while some portions of the network 1025 may not yet be configured to perform the authentication and data usage accounting. In an attempt to maximize the availability of the authentication and data usage accounting, the computing device 15 may be configured to connect to those portions of the network 1025 that support these features over those that do not. This priority may be selective in nature because one or more factors may be taken into account when making these decisions.

Consider the following example. A first base station or some other connection point that supports the authentication and accounting may have a signal strength or load that is comparable to a second base station or other connection point. In this scenario, the computing device 15 may be set up to camp on the first base station or connection point to take advantage of the authentication and accounting features. This selection may also occur even if the first station or point has lower signal strength or a heavier load in comparison to the second station or point. If, however, the first base station or point has much lower signal strength or is carrying a much higher load than that of the second station or point, the computing device 15 may connect to the second station or point to ensure acceptable connection quality.

In one arrangement, the certificate profile may be part of the data plan profile, although these profiles may be separately delivered to the computing device 15. In addition, the certificate profile and the data plan profile may include other information in addition to that presented above, and both profiles are not necessarily required to include all the details illustrated here. No matter which profiles are provided to the computing device 15, any number of them may be configurable, and updated versions may be pushed to the device 15.

Once the computing device 15 receives the certificate profile, the computing device 15 may generate its certificate for signature by the certificate authority. For example, the core secure application 100, the secure application 95 attempting to establish the data session or any other suitable program on the device 15 may generate the certificate. As explained above, the information for creating the certificate may be obtained from the certificate profile. The core secure application 100, the secure application 95 or other program may also generate a private key based on the information contained in the certificate profile. As will be shown below, the private key can be used during the process of authenticating the computing device 15.

In addition, based on the information from the data plan profile, the computing device 15 may establish a connection with the appropriate requesting authority 1015 and may request that the certificate be signed by the appropriate entity. The requesting authority 1015 may then forward the unsigned certificate to the appropriate certificate authority 1020 on behalf of the computing device 15. Because the requesting authority 1015 may have a trusted relationship with the certificate authority 1020, the certificate authority 1020 may automatically sign the certificate using its own private keying material and can return it to the computing device 15 through the requesting authority 1015.

In one arrangement, the signed certificate may be an object that can be shared by different secure applications 95. For example, the signed certificate may be stored in a trusted location and may be accessed only by authorized applications when such applications initiate data session requests. Any suitable location may be used to store the signed certificate for selective retrieval. As a specific example, the secure applications 95 may access the shared certificate through a virtual file system arrangement, and steps can be taken to ensure the requesting secure applications 95 are authorized for the retrieval. Additional information on such a concept can be found in U.S. Patent Application Publication No. 2014/0281499, filed on Jul. 15, 2013, which is herein incorporated by reference. As an example, the private key that the computing device 15 generated may also be shared among the secure applications 95, if desired. In an alternative arrangement, certificates and private keys may also be generated on an individual or group basis for the secure applications 95.

The authentication server may be configured to trust certificates that are issued by the certificate authority 1020. As such, this certificate may be used to authenticate the computing device 15 to enable data exchange and accounting for the device 15. If a data session request is received through a secure application 95 (or other application), the secure application 95 may initiate a connection with the authentication server, as presented above. In response, the authentication server may send a nonce, a one-time token, to the computing device 15, and the secure application 95 may cryptographically sign the nonce with the private key associated with the computing device 15. At this point, the secure application 95 may send the signed nonce and the certificate to the authentication server.

Once the authentication server receives the authentication material, it may check the expiration date of the certificate. If the certificate is still in effect, the authentication server may determine the authority associated with the signature on the certificate. If the signing authority is a trusted authority, the authentication server may then determine whether the request is from a component in possession of the private key. To do so, the authentication server may validate the signature of the nonce with the certificate. If valid, the authentication server may consider the requesting computing device 15 to be authenticated, and the exchange and accounting of data for the session may begin.

If the certificate is expired, if the signing authority is not a trusted authority or if the authentication server cannot validate the computing device 15, the authentication attempt may fail. At this point, the authentication server may signal the computing device 15 of the failure. In one arrangement, the computing device 15 may signal the reporting server 1010 of the failure, and corrective action may be taken to enable the enrollment/authentication of the computing device 15. For example, a new certificate profile may be pushed to the computing device 15 to enable the device 15 to retrieve a new (signed) certificate.

In one embodiment, if the computing device 15 cannot be verified, a direct connection to the requested external entity may be established. In this case, the data exchange may not be conducted through the authentication server, as it cannot trust the requesting computing device 15. Moreover, because the connection will not be through the authentication server, the data accounting process may not occur. To ensure uninterrupted service for the user, however, the computing device 15 may be able to connect to the desired external entity, and conventional (unsegregated) billing may be conducted.

In some cases, the computing device 15 may be owned by or assigned to an employee of an enterprise, which has arranged for the separate data accounting to be carried out. Eventually, the employee may no longer be employed by the enterprise, and the enterprise may wish to revoke the certificate. The certificate may be wiped from the computing device 15, although it may still be in effect. As an example, a listing of this certificate and any others that need to be revoked may be provided to the certificate authority 1020. In response, the certificate authority 1020 may then take steps to revoke the certificate to ensure that it cannot be used again. There may be other scenarios where it may be necessary to notify the certificate authority 1020 to revoke a certificate. For example, if a user switches out a subscriber identification module (SIM) card, the certificate authority 1020 may revoke the affected certificates.

Any number of the processes described herein may be transparent to the requesting secure application 95 and the user. For example, similar to the redirection of the data session requests, the code of the original target application may not need to be modified to handle the generation of the certificate or the authentication of the computing device 15, as such features may be facilitated by the code integrated with the target application to create the secure application 95. In addition, the user may not be required to provide any credentials to initiate the data exchange and accounting. As such, the user may not have to provide a username or password or other verification information to establish the data session.

Eventually, the data session that led to the authentication may be terminated. If another session is initiated, the authentication process may be repeated. That is, the computing device 15 may be configured to carry out the authentication for each data session request. Of course, the authentication may also be selective in nature. For example, if the computing device 15 is on a trusted network or is otherwise located in a trusted location, the authentication may be skipped. In other cases, the authentication may be limited to certain applications or groups of applications. In another embodiment, the session information may be shared among secure applications 95 or applications that have sharing privileges. For example, the state information of the connection may be stored in a predetermined location once the data session with a first application is terminated, and it can be accessed and used by a second (authorized) application. The session information may be stored in any suitable location, such as a secure shared memory unit, and a grace period may apply to the retrieval of such information. For example, the session information may be retrieved by a second application only within a predetermined amount of time following the termination of the session of the first application. Moreover, this sharing of the session information may be limited to only certain applications installed on a computing device.

In one embodiment, steps can be taken to lessen the message exchange between the computing device 15 and the authentication server to reduce overhead. Notably, once the computing device 15 is initially authenticated, the authentication server may store the signed certificate that it received from the computing device 15. The authentication server may also store the signed certificates from other computing devices 15. To distinguish the different certificates, the authentication server can map the incoming IP addresses of the requesting computing devices 15 to the stored certificates to ensure the authentication server retrieves the proper certificate. As such, the computing device 15 is alleviated from sending the certificate to the authentication server for every data session request. In the event that the computing device 15 is assigned a new certificate—such as in the case of a certificate expiring—a conventional message exchange may occur in which the computing device 15 provides the authentication server with the new certificate.

In another embodiment, the computing device 15 can also be configured to automatically generate the nonce and sign it with its private key, instead of having the authentication server create the nonce and deliver the nonce to the device 15. In such a case, the computing device 15, in response to the initiation of a data session request, may simply send the signed nonce (without a signed certificate) to the authentication server for validation. If the abbreviated authentication fails, the computing device 15 may re-initiate its verification by using the unabridged procedure in which it provides the certificate to and receives the nonce from the authentication server.

In either the abbreviated or unabridged authentication procedures, any data that may be generated by the requesting application for exchange with the eventual external entity may be buffered while the computing device 15 is verified. The buffering of such data is similar to the description presented earlier. This feature can make the authentication more transparent to the user.

The enrollment and authentication processes described above may apply to any application installed on the device 15. Such applications may include personal applications or other unsecure applications.

In some cases, a datagram send request may originate from the secure application 95 or other enterprise application, which may involve unreliable transport communication. In such a request, data may be exchanged between endpoints without any prior arrangement or establishment of a channel. For example, some applications may rely on the User Datagram Protocol (UDP) to exchange datagrams with a final destination. A solution is presented here that enables segregated data usage accounting to be conducted for such unreliable transport communications, including an arrangement where the datagrams are redirected for such monitoring. Moreover, such a solution may be transparent to the application through which the unreliable transport communication is initiated, which can ensure that no changes are required to be made to the application, such as updates to the source code of the application.

In one embodiment, the computing device 15 may include both secure applications 95 and unsecure applications 90. Other applications, including enterprise applications, may be installed on the device 15. For purposes of this description, references to secure applications 95 may also apply to enterprise applications, and references to unsecure applications 90 may also be relevant to personal applications. In either case, applications associated with an enterprise may be identified and actions may be performed to enable the segregated accounting.

Referring once again to FIG. 7, a user interacting with the computing device 15 may launch a secure application 95, and the user may initiate unreliable transport communication through the secure application 95. This unreliable transport communication may be to exchange data with one or more of the remote servers 205. As mentioned earlier, the remote server 205 may be contained within a protected network controlled, managed or operated by an enterprise associated with a user of the computing device 15 or the computing device 15 itself. Alternatively, the remote server 205 may be outside the control or management of the enterprise, such as a server operated by another entity. In this case, the remote server 205 may be accessible by persons (or computing devices 15) with no association with the enterprise.

In any event, based on this datagram send request, the computing device 15 may establish a connection with any one or more of the relay servers 705 via any number of the communication networks 210. This connection may be a control channel, and the computing device 15 may receive relevant information from the relay server 705. In addition, the relay server 705 can allocate resources for unreliable transport communications with the appropriate remote server 205. The computing device 15 can conduct the unreliable transport communication with the relay server 705, and the relay server 705 can handle the unreliable transport communication with the remote server 205 on behalf of the computing device 15. This arrangement enables the data exchange to occur between the computing device 15 and the remote server 205 and also permits the calculation unit 710 to determine the amount of data consumed by the relay session. As previously explained, this data usage can be attributed to the secure application 95 and, hence, the enterprise responsible for the operation of the secure application 95. This process may be conducted in a native fashion with respect to the requesting application, which can obviate the need for any changes to be made to the application, such as by the original developer.

Again, this procedure may apply to any application (not just secure applications 95), particularly those that have been identified by an enterprise or other organization as requiring its data consumption to be segregated from a user's personal applications. Moreover, there are numerous ways to cause the redirection of the datagram send request from the computing device 15 to the relay server 705 when unreliable transport communication is involved. Some examples that pertain to this concept will now be presented.

Figure 12:
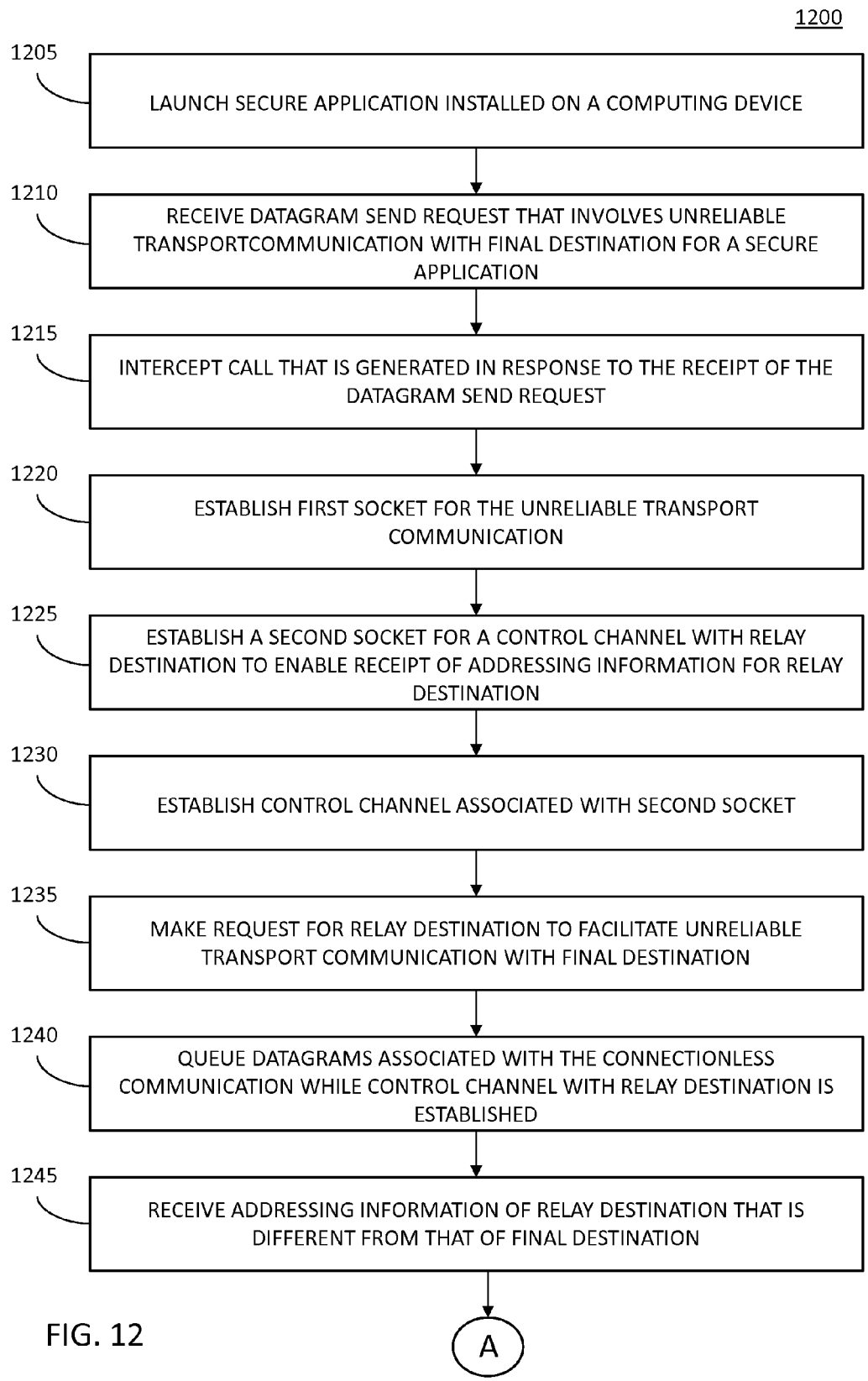
FIG. 12 illustrates an example of part of a method for enabling data usage accounting for unreliable transport communication.

Referring to FIG. 12, a method 1200 for data usage accounting for a connectionless communication is shown. The method 1200 may include additional or even fewer steps or processes in comparison to what is illustrated in FIG. 12. Moreover, the method 1200 is not necessarily limited to the chronological order that is shown in FIG. 12. Although previous figures and text in this document may be referred to when explaining the method 1200, the method 1200 may be practiced with any other suitable systems and components and may take advantage of other suitable processes.

At step 1205, a secure application that is installed on a computing device can be launched, and at step 1210, a datagram send request that involves unreliable transport communication with a final destination can be received for the secure application. A call that is generated in response to the receipt of the datagram send request can be intercepted, as shown at step 1215. At step 1220, a first socket can be established for the unreliable transport communication, and at step 1225, a second socket can be established for a control channel with a relay destination to enable the receipt of addressing information for an unreliable transport relay destination. At step 1230, a control channel associated with the second socket may be established, and a request can be made for the relay destination to facilitate the unreliable transport communication with the final destination, as shown at step 1235. In addition, while the control channel with the relay destination is established, datagrams associated with the unreliable transport communication can be queued, as shown at step 1240.

Figure 13:
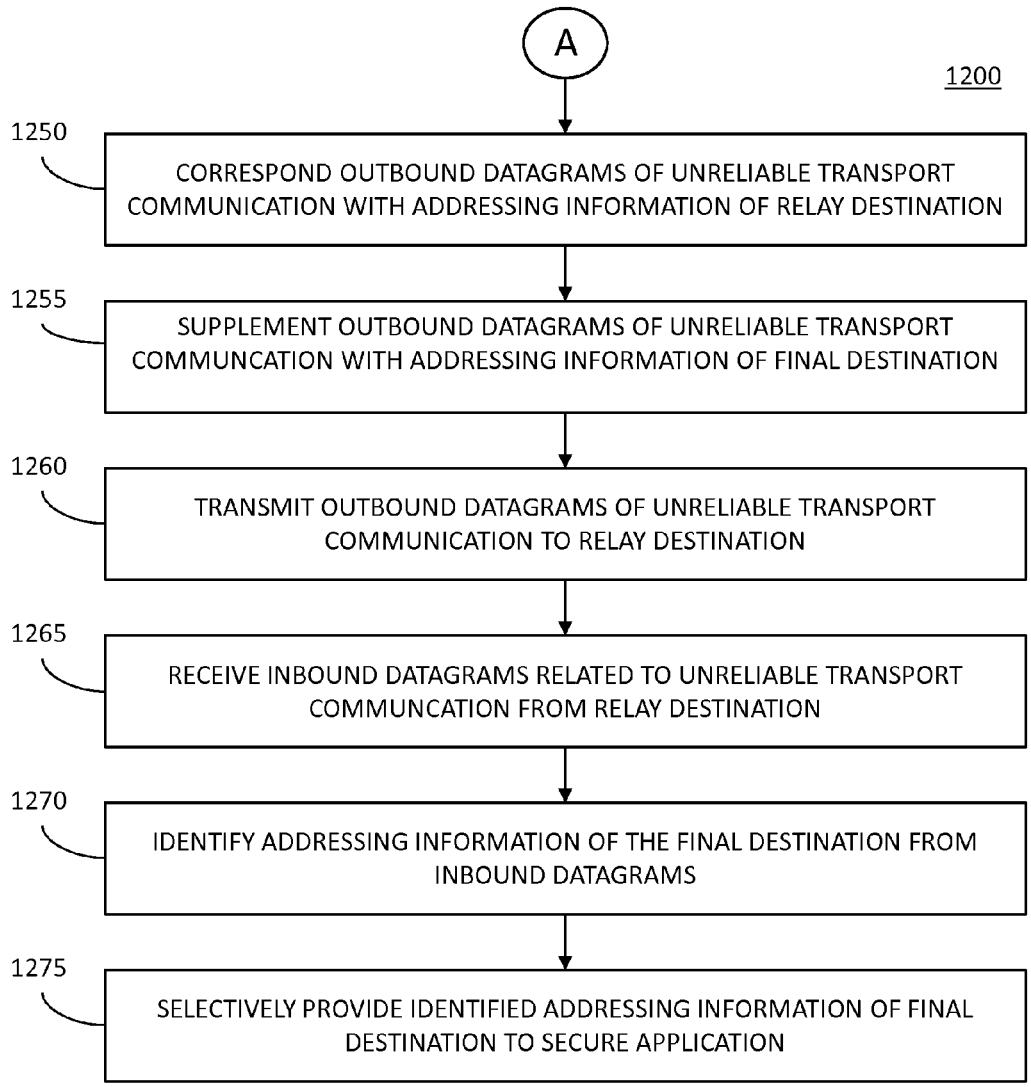
FIG. 13 illustrates an example of another part of the method of FIG. 12 for enabling data usage accounting for unreliable transport communication.

Continuing with the method 1200, at step 1245, addressing information of a relay destination, which is different from that of the final destination, may be received. Turning to FIG. 13, the remainder of the method 1200 is pictured here, which is coupled to the steps of FIG. 12 through jump circle "A." At step 1250, outbound datagrams of the unreliable transport communication can be corresponded with the addressing information of the relay destination. Further, the outbound datagram payloads of the unreliable transport communication can be supplemented with addressing information of the final destination, as shown at step 1255. The outbound datagrams of the unreliable transport communication can be transmitted to the relay destination, which can enable a data usage accounting of the relay session, as shown at step 1260.

At step 1265, inbound datagrams related to the unreliable transport communication may also be received from the relay destination. At step 1270, the addressing information of the final destination may also be identified from the inbound datagram payloads, and the identified addressing information of the final destination can be selectively provided to the secure application, as shown at step 1275.

Figure 14:
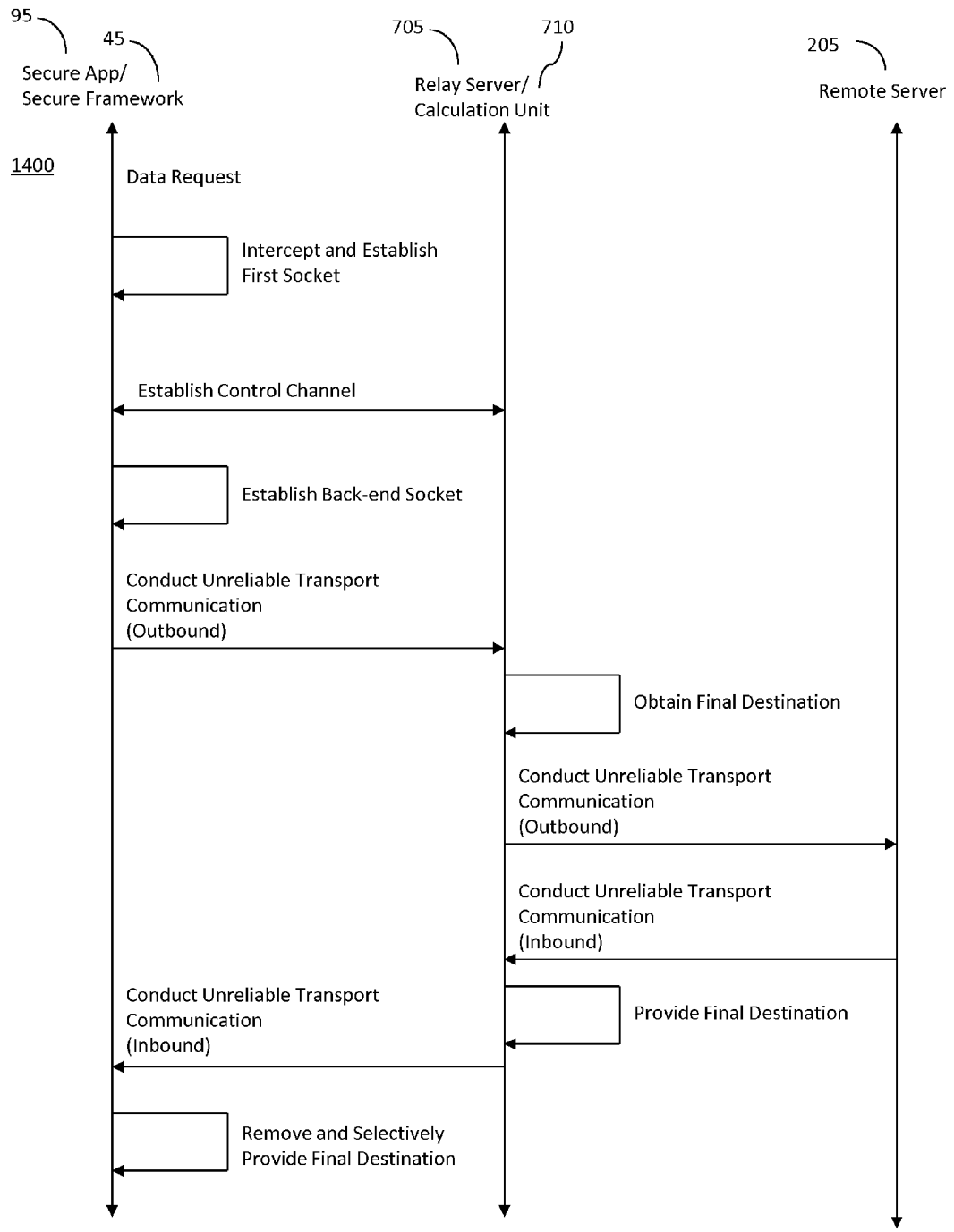
FIG. 14 illustrates an example of an interaction among a secure application, a relay server and a remote server.

To help explain the method 1200, reference will be made to FIG. 14, which illustrates an interaction 1400 among an enterprise application or secure application 95 (along with the secure framework 45), a relay server 705 (and calculation unit 710) and a remote server 205. As previously explained, the secure framework 45 (or adapt layer) may be considered to be part of the secure application 95, and the calculation unit 710 may be part of the relay server 705, although other suitable arrangements may apply to these principles. Moreover, this explanation may be applicable to other applications, and other processes for redirecting the unreliable transport communication to the relay server 705 may be employed here.

Initially, a user may launch the secure application 95, which may have the ability to conduct unreliable transport communications. One example of a suitable protocol that may be employed by the secure application 95 is UDP.

A user may initiate a datagram send request through the secure application 95, which, in this example, may involve unreliable transport communication. This datagram send request may include a final destination, such as addressing information for the remote server 205, and as an example, the request may be conducted in a native fashion with respect to the secure application 95. This feature can enable the original target application to conduct its calls as it normally would, which obviates the need for the source code of the original target application to be altered. The secure application 95, through the secure framework 45, may be configured to intercept the datagram send request. In one embodiment, the unreliable transport communication may be one of two types: (1) through the use of unconnected sockets; or (2) through the use of connected sockets. In this example, the unreliable transport communication may be of the unconnected type, which means the destination address (or final destination) can be made available in each datagram send request (on the socket).

In both cases, a socket call from the secure application 95 can be intercepted by the secure framework 45, which can then bind this socket to an address of a loopback interface that is part of the secure framework 45. This first socket may also be referred to as an app-level socket, as it may be associated with the secure application 95. The secure framework 45 can then return the file descriptor for this socket to the secure application 95 as the socket has been transparently bound to an address associated with the loopback interface. In other words, the secure framework 45 can effectively serve as the operating system by establishing the first socket and allowing the secure application 95—or the underlying original target application—to perform the socket call in its native fashion.

Because this example involves an unconnected socket, the final destination may not be known from the initial request. Thus, in a subsequent call, such as when the secure application 95 is ready to send its data intended for the final destination, the secure application 95 may identify the final destination. For example, the secure application 95 may generate a "send to" call and may provide addressing information for the final destination through a data structure. The secure framework 45 may also intercept this call and can establish a second socket. This second socket, which may also be part of the secure framework 45, can be used to establish a control channel with one or more relay servers 705. For example, the second socket may support a connection-oriented communication in which a connection is established between the endpoints before any useful or substantive data (e.g., payload) is exchanged and in-order delivery of the data is achieved. An example of a protocol that is relevant to this example is the Transmission Control Protocol (TCP), although other protocols or standards may apply here.

As part of the establishment of the control channel, the computing device 15 can be authenticated, such as in accordance with the description above. In addition, the secure framework 45 can request the relay server 705 to allocate resources for unreliable transport communication with the remote server 205 (i.e., final destination). This request can enable the relay server 705 to (eventually) forward the relevant datagrams to the final destination. In addition, the relay server 705 can return the addressing information of the unreliable transport relay back to the secure framework 45 over the control channel previously established between the computing device 15 and the relay server 705.

The secure framework 45 may also establish another socket (i.e., third socket or back-end socket) for unreliable transport communication with the relay server 705. Through this back-end socket, the secure framework 45 can use the addressing information provided by the relay server 705 when the secure framework 45 calls the operating system of the computing device 15 for the (outbound) unreliable transport communication with the relay server 705. The back-end socket may also be associated with or mapped to the first unconnected app-level socket that was established for the underlying application.

As noted above, the secure framework 45 can request the relay server 705 to set up a corresponding unreliable transport communication with the final destination. To enable this data exchange, however, the relay server 705 should be able to determine the relevant addressing information of the datagrams transmitted from the computing device 15. As an example, the secure framework 45 can attach, tag or otherwise add the addressing information of the final destination to the datagrams that are to be sent to the relay server 705. Although there are numerous ways in which this process may be executed, one example of how the secure framework 45 may accomplish this step is by pre-pending a header to the datagrams. This header, in one arrangement, may be part of a payload section of the datagrams, although other sections of the datagrams may be used. For convenience, the datagrams that are transmitted from the secure application 95 to the relay server 705 and the final destination may be referred to as outbound datagrams.

As part of the process of delivering the datagrams to the relay server 705, the secure framework 45 can perform a native call to the operating system and can correspond the outbound datagrams of the unreliable transport communication to the addressing information of the relay server 705. That is, the secure framework 45 can provide this addressing information to the operating system as part of, for example, a "send to" call. In response, the standard networking interface can process the unreliable transport data for delivery to the relay server 705. As a result, the datagrams, which can be supplemented with the addressing information of the final destination, may be forwarded to the relay server 705. This redirection of the outbound data to the relay server 705 may (at least initially) supplant the intended location, the final destination.

In one arrangement, while the process of setting up the control channel, the back-end socket or both occurs, the outbound datagrams that are generated by the secure application 95 can be queued or temporarily stored until they can be sent to the relay server 705. This feature can add to the efficiency of the redirection and authentication processes that can occur for such unreliable transport communications. Once these elements are set up, the outbound datagrams may not need to be queued.

As the relay server 705 receives the datagrams sent from the computing device 15, the relay server 705 can determine/obtain the final destination of the datagrams by reading the addressing information with which the datagrams were supplemented. The relay server 705 can then establish its own back-end unreliable transport socket for delivering the datagrams to the final destination. This unreliable transport data exchange between the relay server 705 and the final destination can be conventional in nature in that the relay server 705 is not required to take any special steps to facilitate the delivery of the datagrams to the final destination once the relay server 705 is aware of the addressing information of the final destination.

As part of this exchange, the final destination may generate its own datagrams for delivery to the secure application 95. For convenience, these datagrams may be referred to as incoming datagrams. Initially, the final destination can deliver the inbound datagrams to the relay server 705 through unreliable transport communication. The relay server 705 may also supplement the incoming datagrams with the addressing information of the final destination. As an example, the relay server 705 may pre-pend a header to the incoming datagrams, which can be part of a payload section of the datagrams that can include the addressing information of the final destination. The incoming datagrams can then be directed to the computing device 15 for eventual delivery to the secure application 95.

When the incoming datagrams are received at the unreliable transport back-end socket, the secure framework 45 of the secure application 95 can read the inbound datagrams off the back-end socket. In one arrangement, the secure framework 45 can identify the addressing information of the final destination that was embedded in the incoming datagrams and can remove this data from the incoming datagram payloads. In addition, because the secure framework 45 is aware of which app-level socket (i.e., first socket) is paired with the back-end socket, the secure framework 45 can deliver the incoming datagrams to the app-level socket. In response, the secure application 95 may make a call that requires the addressing information of the final destination that the secure framework 45 has stripped out. For example, the secure application 95 may call "receive from," which requires the addressing information, which the secure framework 45 may intercept. In this case, the secure framework 45 may fill in the appropriate data structure with the addressing information of the final destination that it stripped out of the incoming datagrams. As such, the underlying target application of the secure application 95 can receive the incoming datagrams with the proper addressing information using its native call(s), which can be exactly what would have been provided if the data session request had not been redirected to the relay server 705. As part of this process, the target application may also receive the original payload that would have normally been delivered if the redirect of the delivery of the inbound datagrams had not occurred.

Because this redirection process is transparent to the underlying application, the underlying application may perform its native calls for these unreliable transport communications, which obviates the need for the original developer to perform any changes to the application once it is a secure application 95. Moreover, because the secure framework 45 can be dynamically updated, the secure application 95 may be configured to interact with many different types of protocols or other networking solutions to enable the redirection to the relay server 705. These dynamic updates also do not require any changes to the underlying target application by the developer. Additional information on such dynamic updates can be found in U.S. patent application Ser. No. 14/614,866, which was filed on Feb. 5, 2015, and U.S. Patent Application No. 62/119,586, which was filed on Feb. 23, 2015, each of which is incorporated herein in its entirety. As mentioned earlier, this redirection enables the unreliable transport data exchange to occur with a simultaneous metering of the exchanged data to permit enterprise billing separate from personal billing.

As noted above, unreliable transport communication may also be a connected type. In this case, a socket configured for this type of communication may only send and receive datagrams to/from a single address. When dealing with this type of event, the process of exchanging the data is similar to that for an unconnected socket, although there are several differences. In particular, when the secure application 95 makes the initial socket call, the socket call may identify the addressing information of the final destination, such as through a "connect" call. In this case, the secure framework 45 may proceed with establishing the app-level socket bound to the loopback interface, the control channel, and the back-end unreliable transport socket, as described above. Because the secure framework 45 knows the addressing information of the final destination at the "connect" call, the relay for the redirect may be set up prior to the "send" calls. In this case, the outbound datagrams may not be required to be queued because the redirect relay may already be arranged by the time the secure application 95 makes a datagram send request. Of course, if the relay is not established in time, these datagrams may be queued until the relay is completed, in accordance with the example presented above.

When the secure application 95 is ready to send outbound datagrams in the case of a connected socket, the secure application 95 may make a call that does not include the addressing information of the final destination, such as a "send" call. To accommodate this call, the secure framework 45 of the secure application 95 may store the addressing information of the final destination that it received from the previous "connect" call. When the "send" call comes in, the secure framework 45 can supplement the outbound datagrams with the addressing information of the final destination, such as by pre-pending them with a header that may be part of the datagram payload section. This process can be similar to the technique outlined above with respect to the use of the unconnected socket. Likewise, the outbound datagrams can be delivered to the relay server 705 and eventually, to the final destination.

When the inbound datagrams come in from the final destination through the relay server 705, the process of sending them to the underlying application of the secure application 95 is similar to that for the unconnected socket version, except for a few differences. For example, because a connected socket is involved here, the call for receiving the datagrams may not have a need for the addressing information of the final destination, such as a "receive" call. In this case, the secure framework 45 can simply strip out the addressing information of the final destination from the inbound datagrams before they are delivered to the app-level socket. Because the call does not require this addressing information, such data can simply be deleted. In either case (unconnected or connected), once the data session is completed or at any other suitable stage of the communication event, the allocated resources may be torn down and may be available for other processes.

As can be seen, this arrangement allows for both connected and unconnected versions of unreliable transport communication events. Thus, the underlying application of the secure application 95 (and by extension, the secure application 95) may be configured to support either type (even both), and the secure framework 45 can accommodate either one. This versatility also can eliminate the need for the developer to make any changes to the original target application (e.g., no access to the source code of the original target application is needed) once it has been wrapped to create the secure application 95. This solution may be particularly useful for enterprise applications that require a real-time transport or relatively fast data exchanges, such as VoIP applications.

While this description has primarily focused on the redirection of datagrams from the computing device 15 to the relay server 705, the principles here are not necessarily limited to such an arrangement. For example, as previously noted, the data usage accounting associated with a secure application 95 may be conducted locally at the computing device 15. In this case, the use of a relay server 705 may not be needed, as the secure application 95 may be configured to meter the data consumed through the unreliable transport communication. If the relay server 705 is not required, the secure application 95 may not have to establish a control channel to retrieve addressing information of the relay server 705. That is, the secure framework 45 may facilitate the unreliable transport communication—through the operating system of the computing device 15—directly with the intended final destination. Moreover, the secure framework 45 may not have to supplement the payload sections of the outbound datagrams with the addressing information of the final destination or have to remove such addressing information from the payload sections of the inbound datagrams.

In this arrangement, the datagram send request that originates from the secure application 95 may be native in nature with respect to the underlying application of the secure application 95. In addition, the redirection of the datagram send request back to the secure framework 45 may be transparent to the underlying application of the secure application 95. Thus, the segregated metering of data (i.e., enterprise versus personal) consumed through unreliable transport communications may be conducted with or without the use of a relay server 705.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of enabling data usage accounting for an unreliable transport communication, comprising:
   launching an enterprise application that is installed on a computing device, wherein the enterprise application has been identified for data usage accounting separate from personal applications installed on the computing device;
   receiving through the enterprise application a datagram send request that involves unreliable transport communication intended for a final destination;
   transparently redirecting the datagram send request to facilitate the unreliable transport communication with a relay destination instead of the final destination;
   requesting the relay destination to facilitate another unreliable transport communication with the final destination; and
   receiving data from the final destination via the unreliable transport communication with the relay destination.

2. The method according to claim 1, wherein transparently redirecting the datagram send request to facilitate the unreliable transport communication with a relay destination instead of the final destination comprises:
   establishing a control channel with the relay destination in response to the receipt of the datagram send request through the enterprise application; and
   receiving addressing information of the relay destination of the unreliable transport communication over the control channel.

3. The method according to claim 2, wherein requesting the relay destination to facilitate another unreliable transport communication with the final destination comprises requesting over the control channel the relay destination to facilitate another unreliable transport communication with the final destination.

4. The method according to claim 3, further comprising:
   corresponding datagrams of the unreliable transport communication with the relay destination with the addressing information of the relay destination; and
   adding addressing information of the final destination to the datagrams of the unreliable transport communication to enable the relay destination to facilitate the other unreliable transport communication with the final destination.

5. The method according to claim 4, wherein adding addressing information of the final destination to the datagrams of the unreliable transport communication comprises adding addressing information of the final destination to a payload section of the datagrams of the unreliable transport communication.

6. The method according to claim 2, further comprising queuing the datagrams while the control channel with the relay destination is established.

7. The method according to claim 1, wherein receiving data from the final destination via the unreliable transport communication with the relay destination comprises:
   receiving datagrams that have had addressing information of the final destination added thereto; and
   removing the addressing information of the final destination from a payload section of the received datagrams for distribution to the enterprise application.

\* \* \* \* \*